(12) United States Patent
Inaguma et al.

(10) Patent No.: US 7,601,672 B2
(45) Date of Patent: Oct. 13, 2009

(54) HIGH AL STAINLESS STEEL SHEET AND HONEYCOMB BODIES EMPLOYING THEM

(75) Inventors: Tooru Inaguma, Futtsu (JP); Shogo Konya, Futtsu (JP); Hiroaki Sakamoto, Futtsu (JP); Motonori Tamura, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/535,602

(22) PCT Filed: Nov. 20, 2003

(86) PCT No.: PCT/JP03/14832

§ 371 (c)(1),
(2), (4) Date: Dec. 12, 2005

(87) PCT Pub. No.: WO2004/046406

PCT Pub. Date: Jun. 3, 2004

(65) Prior Publication Data

US 2006/0166029 A1    Jul. 27, 2006

(30) Foreign Application Priority Data

| Nov. 20, 2002 | (JP) | ............................. 2002-336048 |
| Nov. 20, 2002 | (JP) | ............................. 2002-336049 |
| Nov. 20, 2002 | (JP) | ............................. 2002-336050 |
| Nov. 20, 2002 | (JP) | ............................. 2002-336051 |
| Nov. 20, 2002 | (JP) | ............................. 2002-336052 |
| Nov. 20, 2002 | (JP) | ............................. 2002-336053 |
| Nov. 25, 2002 | (JP) | ............................. 2002-340969 |

(51) Int. Cl.
*B01J 35/04* (2006.01)
*C22C 38/06* (2006.01)
*C22C 38/20* (2006.01)
*C22C 38/26* (2006.01)

(52) U.S. Cl. ......................... 502/439; 428/593; 420/40; 420/79

(58) Field of Classification Search ................. 428/606, 428/607, 650, 652, 653, 681, 685, 335, 332, 428/336, 593, 73, 116, 117, 72; 420/34, 420/62; 148/325
See application file for complete search history.

(56) References Cited

U.S. PATENT DOCUMENTS 4,602,001 A     7/1986   Cyron
4,784,984 A  *  11/1988  Yamanaka et al. .......... 502/439

(Continued)

FOREIGN PATENT DOCUMENTS

DE        36-21569        1/1988

(Continued)

*Primary Examiner*—John J Zimmerman
(74) *Attorney, Agent, or Firm*—Kenyon & Kenyon LLP

(57) ABSTRACT

The present invention provides an Fe—Cr—Al based stainless steel sheet and double layered sheet having a high Al content of greater than 6.5%, honeycomb bodies employing the stainless steel sheet or double layered sheet, and a process for fabrication of the steel sheet or double layered sheet. The sheet is a high Al-containing Fe—Cr—Al based stainless steel sheet or high Al-containing double layered sheet characterized by comprising, by weight, Cr: 10-30% and Al: >6.5%-15%. Preferably, the steel sheet further comprises either or both Ti: 0.02-0.1% and Nb: 0.02-0.3%, and also comprises La: 0.01-0.1%, Ce: 0.01-0.1% and P: 0.01-0.05%. It also preferably comprises Cu: 0.01-1.0% by weight, and preferably further comprises Mg: 0.001-0.1% by weight. There is also provided a honeycomb body fabricated using the Fe—Cr—Al based stainless steel sheet.

4 Claims, 4 Drawing Sheets

U.S. PATENT DOCUMENTS

| | | | |
|---|---|---|---|
| 4,870,046 A | * | 9/1989 | Yamanaka et al. .......... 502/439 |
| 5,173,471 A | | 12/1992 | Usui et al. |

FOREIGN PATENT DOCUMENTS

| | | | |
|---|---|---|---|
| EP | 0-243702 | | 11/1987 |
| EP | 0-392203 | | 10/1990 |
| EP | 392203 | * | 10/1990 |
| EP | 0-497992 | | 8/1992 |
| JP | 63-232850 | | 9/1988 |
| JP | 01-115455 | | 5/1989 |
| JP | 2-86848 A | | 3/1990 |
| JP | 02-254136 | | 10/1990 |
| JP | 04-350148 | * | 12/1992 |
| JP | 4-350148 A | | 12/1992 |
| JP | 05-277378 | | 10/1993 |
| JP | 06-000389 | | 1/1994 |
| JP | 06-99076 | | 4/1994 |
| JP | 06-320014 | | 11/1994 |
| JP | 06-327937 | | 11/1994 |
| JP | 08-168679 | | 7/1996 |
| JP | 08-168680 | | 7/1996 |
| JP | 09-192503 | | 7/1997 |
| JP | 11-335789 | | 12/1999 |
| JP | 11-514929 | | 12/1999 |
| JP | 20-01164341 | | 6/2001 |
| WO | WO 97/07888 | | 3/1997 |

* cited by examiner

HONEYCOMB BODY

BINDER SOLUTION OR Al POWDER PAINT

AIR BLOW

HONEYCOMB BODY

HIGH AL STAINLESS STEEL SHEET AND HONEYCOMB BODIES EMPLOYING THEM

FIELD OF THE INVENTION

The present invention relates to a stainless steel sheet, and particularly it relates to a high Al Fe—Cr—Al based stainless steel sheet and a high Al double layered sheet, and to a process for their fabrication. The invention further relates to a high Al Fe—Cr—Al based stainless steel sheet used for production of an exhaust gas catalyst-carrying honeycomb structure with excellent heat resistance and oxidation resistance. The invention still further relates to honeycomb bodies using the steel sheet or double layered sheet and to a process for their production.

BACKGROUND ART

Metal carriers comprising heat resistant alloy honeycomb structures housed in similarly heat resistant alloy jackets have recently come into common use as exhaust gas purifying catalyst carriers for internal combustion engines in automobiles and the like. A honeycomb structure is commonly formed by alternately laminating a flat foil with a thickness of about 50 μm with a corrugated foil obtained by corrugating the flat foil, and may be used in the form of the alternate laminate of the flat foil and corrugated foil, or as a spiral coil of stacked bands of the flat foil and corrugated foil.

In a conventional ceramic carrier, the temperature of the catalyst is too low for activation during the initial engine start-up period, and therefore most of the harmful components of the exhaust gas (HC, NOx, CO, etc.) are released during the initial engine start-up period. In contrast, a metal carrier offers numerous advantages, such as low heat capacity compared to conventional ceramic carriers, such that the heat energy of the exhaust gas itself produces rapid heating to a temperature at which the catalyst functions, for superior exhaust gas purification during the initial engine start-up period. With the increasingly rigorous restrictions on automobile exhaust gases in the U.S., Europe and Japan in recent years, demand is rising for even more rapid activation of catalysts. For this reason, there is a need for further reduction in the heat capacity of metal carriers, and this has created a demand for foil materials which are even thinner than the conventional 50 μm thickness for metal carrier foils.

The compositions employed for foil materials are commonly Fe—Cr—Al based alloys such as Fe-20 wt % Cr-5 wt % Al, as described in Japanese Examined Patent Publication HEI No. 6-8486, for example. The alloy in this composition forms a dense $Al_2O_3$ film on the surface when exposed to a high-temperature oxidizing atmosphere, and formation of the $Al_2O_3$ film inhibits the rate of oxidation and is therefore highly advantageous from the viewpoint of oxidation resistance.

As mentioned above, the need for reduced heat capacity of catalyst carriers has led to a demand for construction of metal carrier honeycombs with foils thinner than 30 μm and with lower heat capacity. On the other hand, a smaller foil thickness results in a lower absolute retention of the Al which supports oxidation resistance in the Fe—Cr—Al based stainless steel sheet, thereby reducing the oxidation resistance of the foil. The Al content therefore preferably should exceed 6.5% in order to form a metal carrier with excellent oxidation resistance, particularly when using a foil material with a thickness of less than 30 μm.

Ordinary metal honeycomb bodies are subjected to brazing with brazing materials at all or portions of the joints between foils, and in stainless steel sheets comprising Al at 6.5% or greater, an alumina film forms on the steel sheet surface during the brazing treatment and significantly impairs the wettability of the brazing material.

When a foil material is produced in mass in an ordinary steelmaking/rolling process, an Al content of greater than 6.5% in an Fe—Cr—Al steel sheet will impair the hot rolled workability and hot rolled sheet toughness, and therefore the greater number of passes required will result in the disadvantage of increased production cost. Thus, measures for improved oxidation resistance by simple increase in Al cannot be adopted in the conventional process. A demand therefore exists for a process wherein cost is not increased even by conventional means.

In a metal catalyst carrier, the Al in the metal foil is oxidized in the high-temperature exhaust gas, forming alumina ($Al_2O_3$) and consuming the Al in the foil. The Cr is oxidized next to chromium oxides, and iron chromium oxide is formed on the foil surface so that the oxidation resistance is maintained, but depletion of the Al results in deformation of the metal foil, more loss of the oxides, breaking of the foil and loss of the function as a carrier.

In order to prevent depletion of Al in the metal foil and extend the durable life of the catalyst carrier, it is effective to increase the amount of Al in the foil. In particular, a smaller metal foil thickness requires an increase in the Al concentration of the foil to ensure an absolute amount of Al. However, special processing steps are necessary when the amount of Al in stainless steel exceeds 6 wt %, while at greater than 8.0 wt % the workability is notably impaired, making rolling of the foil difficult. Especially in the case of stainless steel foils with a sheet thickness of 60 μm or smaller, materials with Al contents exceeding 7.0 wt % are poorly suited for mass production in terms of workability, and even when foil rolling is possible, corrugation results in numerous cracks and hence it is difficult to form honeycomb bodies.

In Japanese Examined Patent Publication HEI No. 4-51225 there is disclosed a process for fabrication of an exhaust gas purification catalyst wherein the surface of a stainless steel sheet with an Al content of no greater than 6.0% is plated with Al and subjected to foil rolling, and the foil is used to form a honeycomb body, after which heat treatment is carried out in a non-oxidizing atmosphere. Cold rolling and honeycomb working can be accomplished since the Al content is no greater than 6.0% at the steel sheet stage, and the subsequent heat treatment in the non-oxidizing atmosphere actively dissolves the plated Al into the steel sheet, thereby ensuring an amount of Al necessary for oxidation resistance.

For production of a metal carrier, a stainless steel flat foil and corrugated foil are alternately wound or laminated to produce a honeycomb body form, and then the points of contact between the flat and corrugated foils are brazed for bonding. For this purpose, a brazing metal is coated onto the stainless steel foil surface either after the honeycomb body has been formed or before it is formed, and the honeycomb body is heated at high temperature to melt the brazing metal and create brazed joints at the foil contact sections.

When a honeycomb body is formed using a metal foil comprising a stainless steel foil coated with Al on the surface, as described in Japanese Examined Patent Publication HEI No. 4-51225, the Al on the foil surface undergoes vaporization loss after the honeycomb body has been formed, specifically during the high-temperature heat treatment for diffusion of the foil surface Al into the stainless steel or during the high-temperature heat treatment for brazing, and in some cases the Al content of the stainless steel cannot be adequately increased. Also, the Al in the stainless steel foil surface and the brazing metal will sometimes react before brazing, during the temperature increase period prior to brazing, thus producing high melting point intermetallic compounds and impairing the bonding property at the brazed sections.

As explained above, a catalyst-carrying catalyst converter is situated in the exhaust gas path for the purpose of purifying exhaust gas from internal combustion engines. A carrier supporting a catalyst in the same manner may also be used in methanol-converting devices which perform water vapor conversion of hydrocarbon compounds such as methanol to produce hydrogen-rich gas, CO-removing devices which convert CO to $CO_2$ for its removal, or $H_2$-burning devices which burn $H_2$ to $H_2O$ for its removal. Such catalyst carriers comprise numerous cells through which the gas passes, with the catalyst being coated on the walls of each cell, thereby allowing contact between the passing gas and the catalyst over a wide contact area.

Catalyst carriers which can be used for this purpose include ceramic catalyst carriers and metal catalyst carriers. For a metal catalyst carrier, a heat-resistant alloy-containing flat foil with a thickness of several micrometers and a corrugated foil are alternately wound or laminated to make a cylindrical metal honeycomb body, and the metal honeycomb body is inserted into a cylindrical metal jacket to make a metal carrier. A catalyst-supporting layer comprising the catalyst impregnated is formed on the metal foil surface of the cells of the honeycomb body which serve as the gas pathways of the metal carrier, to produce a catalyst carrier. The contacting portions of the flat foil and corrugated foil of the honeycomb body comprising the wound and laminated flat foil and corrugated foil are bonded by means such as brazing, to produce the honeycomb body as a firm structure.

The catalyst may be supported on the metal foil surface of the honeycomb body by a method in which the metal foil surfaces of the cells of the honeycomb body which serve as the gas pathways of the metal carrier are coated with a porous γ-alumina layer known as a wash coat layer and then a catalyst comprising a rare metal or the like is impregnated into the wash coat layer, or a method in which a wash coat layer containing the catalyst is coated onto the metal honeycomb body. The method for forming the wash coat layer on the cell surface of the metal honeycomb body may be a method in which the honeycomb body is immersed in the wash coat solution to attach the wash coat solution onto the cell surfaces of the honeycomb body, and is then dried to form a wash coat layer on the cell surfaces.

Japanese Examined Patent Publication HEI No. 8-197 describes a method of forming a honeycomb body using an Al-containing stainless steel metal foil, subsequently heat treating it in air and utilizing the Al in the steel to produce α-alumina whiskers on the stainless steel surface, and coating the needle-like crystals with γ-alumina, for the purpose of improving cohesion between the metal foil surface and wash coat layer of the metal honeycomb body. A method of heat treating Al-containing stainless steel in a $CO_2$ atmosphere beforehand is described in Japanese Unexamined Patent Publication SHO No. 57-71898, as a method of accelerating production of the α-alumina whiskers.

For α-alumina whiskers to be produced on the metal foil surface it is necessary for the honeycomb body to be heat treated in air or in a specific atmosphere. Since the foil material is the source of Al for the α-alumina whiskers, the Al concentration of the foil material decreases due to the α-alumina whiskers. As a result, the original oxidation resistance of the foil cannot be exhibited.

For exhaust gas purification using a catalyst carrier, the catalyst reaction is accelerated, and exhaust gas purification efficiency improved, by more active substance movement between the exhaust gas passing through the honeycomb body cells and the catalyst on the cell surfaces.

Incidentally, the wash coat layer (γ-$Al_2O_3$) is formed on the foil surface of the honeycomb body first, after which a rare metal catalyst is loaded to produce the catalyst carrier. The loadability and high temperature stability of the wash coat on the metal carrier is important for maintaining and improving the catalyst purification performance, and various types of treatment are currently being combined for this purpose.

The wettability is poorer between stainless steel foil surfaces and wash coat layers of metal carriers, as compared to ceramic carriers such as cordierite, and therefore the loadability of the wash coat is insufficient, such that a surfactant or the like must be used for pretreatment.

The high temperature stability of the wash coat is important to maintain the specific surface ratio (a specific surface ratio of about 80-160 $m^2/g$ with 0.5-40 μm micropores) and increase the reaction efficiency. The γ-$Al_2O_3$ used for the wash coat undergoes a phase transition to α-$Al_2O_3$ from about 900° C. This leads to breakup of the microstructure of the micropores, thereby notably reducing the specific surface ratio. Thus, in order to increase the phase transition temperature and increase the thermal stability of the wash coat, a rare earth oxide such as $CeO_2$ is dispersed in the wash coat.

The wash coat also importantly acts as a co-catalyst, adsorbing oxygen to supplement the catalytic action, and since $CeO_2$ is also effective for this purpose it is often added in a large amount.

A metal foil with satisfactory wettability with the wash coat is preferably used for the metal carrier, since this will result in satisfactory loadability of the wash coat without pre-treatment using a surfactant or the like. Also, the metal foil of the metal carrier preferably has the power to improve the high temperature stability or oxygen-storing effect of the wash coat, since this will eliminate the need to disperse a rare earth oxide such as $CeO_2$ in the wash coat. It is currently the case that heavy metals such as Cr or Ni, which are added to stainless steel foils and effectively improve the workability or corrosion resistance of the foils, have an oxygen-storing effect but also sometimes accelerate α-transition of γ-$Al_2O_3$, such that improvement is not easily achieved by addition of large amounts of Cr or Ni.

In a catalytic carrier for exhaust gas purification, the catalyst reaction is accelerated when the catalyst carrier reaches a temperature above its ignition point. Since the temperature of the catalyst carrier is low when the engine is started, the temperature of the exhaust gas passing through raises the temperature of the catalyst carrier and the catalyst reaction begins only after the temperature exceeds the ignition point. The time period from starting of the engine to initiation of the catalyst reaction is preferably minimized because it is during this period that the emitted exhaust gas is discharged without being purified by the catalyst. It is therefore important to increase the catalyst carrier temperature elevation rate during engine startup to improve the purification performance immediately after start-up.

The following methods have been disclosed for increasing the catalyst carrier temperature elevation rate during engine startup to improve the purification performance immediately after start-up.

Japanese Unexamined Patent Publication HEI No. 6-997976 describes an invention which is a tandem-type metal carrier wherein the sheet thickness of the honeycomb body at the exhaust gas upstream end is made smaller than the sheet thickness of the honeycomb body at the downstream end, thereby reducing heat conduction in the radial direction of the honeycomb body at the upstream end, and tending to form a heat spot. It is stated that the catalyst carrier temperature elevation time is effectively shortened by further reducing the foil thickness of the honeycomb body.

Japanese Unexamined Patent Publication HEI No. 6-320014 describes an invention wherein slits are formed in the sheet of the honeycomb at the engine-end.

Japanese Unexamined Patent Publication HEI No. 6-327973 describes an invention wherein a heating coil is provided around the carrier to allow an induction current to flow, in order to increase the temperature of the catalyst by induction heating.

Also, Japanese Unexamined Patent Publication HEI No. 9-192503 describes an invention wherein a flat foil with a thickness of no greater than 30 μm and a corrugated foil are used to construct 100-400 cells per square inch, and the outermost periphery of the honeycomb body is covered with an elastic retaining member with a heat-insulating property. The heat-insulating mechanism in combination with the thinner foil prevents heat loss from the outer periphery of the honeycomb body and improves the temperature elevation property.

The prior art inventions described above are aimed at increasing the temperature elevation rate of the catalyst carrier to improve the purification performance immediately after engine start-up. They therefore involve reducing the sheet thickness, adding slits to the flat sheet or adding a secondary heating mechanism or heat-insulating mechanism.

However, reducing the thickness of the foil lowers both the honeycomb body strength and the oxidation resistance. Foil thickness reduction is achieved when applying the invention described in Japanese Unexamined Patent Publication HEI No. 8-168680, but only up to a certain limit. Adding slits to the flat sheet will unavoidably reduce the strength of the flat sheet at those sections, while cost is also increased by the slit forming step. Furthermore, addition of a secondary heating or heat-insulating mechanism also increases the overall volume and raises costs.

Incidentally, the heat capacity of the honeycomb body can be lowered to improve the temperature elevation speed during engine start-up by reducing the thickness of the metal foil of the honeycomb body. It is known that reducing the foil thickness lowers the oxidation resistance, and methods have been proposed for increasing the Al concentration in the metal foil of the honeycomb body. However, apart from the oxidation resistance with smaller thickness, it is important to guard against problems such as flaking of the honeycomb body due to the high-temperature, high-pressure exhaust gas during use, or its collapse or break up under thermal stress.

In Japanese Unexamined Patent Publication HEI No. 5-27737 there is disclosed an invention wherein an inexpensive Y misch metal is added to an Fe—Cr—Al alloy to ensure oxidation resistance, and one or more metals from among Nb, Ta, Mo and W is further added to improve the high-temperature proof strength, the body being able to withstand a cold-heat durability test with exhaust gas at 900-1000° C.

Also, Japanese Unexamined Patent Publication HEI No. 6-389 discloses an invention wherein the metal carrier is composed of a honeycomb made of a stainless steel foil material having a high-temperature proof strength at 600° C. and 700° C. of 22 kgf/mm$^2$ or greater and 11 kgf/mm$^2$ or greater, respectively, with durability that can withstand a cold-heat durability test with exhaust gas at 900-1000° C.

Japanese Unexamined Patent Publication HEI No. 8-168679 discloses a honeycomb body wherein all of the points of contact between the flat sheet and foil sheet of the honeycomb body are bonded, which has excellent durability with an elastic modulus of no greater than 200 kg/mm$^2$ in the radial direction.

Also, Japanese Unexamined Patent Publication HEI No. 8-168680 describes a honeycomb body have a foil thickness of between 17 μm and 40 μm, a proof strength of 350/t (kgf/mm$^2$) or greater at 700° C., and a specified relationship between the Al and Cr content and the foil thickness t.

All of these prior art technologies are aimed at improving the high-temperature durability of the honeycomb body, and were developed for the purpose of increasing the proof strength at high temperature and reducing the partial elastic modulus in the honeycomb body. Methods which improve proof strength invariably lower the material workability, and also increase working costs for rolling and the like. Moreover, the effects of methods which locally reduce the honeycomb body elastic modulus are insufficient when the foil temperature increases above 1000° C.

Incidentally, it has been attempted in recent years to construct honeycombs with thin foils of 30 μm and smaller for increased heat capacity of catalyst carriers, since the heat capacity is too high with the conventional thickness of 50 μm. On the other hand, since a small foil thickness leads to lower absolute retention of Cr and Al which maintain the oxidation resistance, the oxidation resistance of a foil is proportional to its thickness, given the same chemical composition. Consequently, since the oxidation resistance of thin foils is reduced in most cases, and particularly with a thin foil of 30 μm or smaller, the alloy design must be such as to maximize the oxidation resistance above that of conventional foils. A thin foil of 30 μm or smaller preferably has an Al content of 6 wt % or greater.

When such a high-Al thin foil is used for mass production of a foil material in an ordinary steel-making, hot-rolling or cold-rolling process, the amount of Al which can be added to the Fe—Cr—Al based alloy is limited by problems such as the rolling property, and means intended to improve the oxidation resistance simply by increasing the amount of Al in an ordinary process tend to raise the rolling costs.

Published Japanese translation of PCT international publication for patent application HEI No. 11-514929 discloses a method wherein either the flat foil or corrugated foil of the honeycomb structure is an Fe—Cr—Al based alloy and the other is a layered structure comprising an Fe—Cr based alloy and an Al-containing layer, and diffusion treatment is carried out. In this method, however, Al is not enriched in the Fe—Cr—Al based alloy without the Al-containing layer, and it is difficult to obtain an Al concentration of 7 wt % or greater as a whole.

U.S. Pat. No. 4,602,001 discloses a method wherein the cell walls of a honeycomb structure composed of a steel foil with an Al content of no greater than 1 wt % are coated with Al powder, and heat treated. However, since this method employs alloy steel with an Al content of 1 wt % as the starting material, coating irregularities occurring during coating of the Al powder tend to promote abnormal oxidation at those portions.

It is an object of the present invention to solve the problems described above. Specifically, it is an object of the invention to provide an Fe—Cr—Al based stainless steel sheet and double layered sheet comprising Al at greater than 6.5% and having satisfactory hot rolled sheet ductility and excellent wettability for brazing metals, as well as a process for their fabrication, an Fe—Cr—Al based stainless steel sheet which makes it possible to achieve improved cohesion between the metal surface and wash coat layer of the metal honeycomb body of an exhaust gas purification catalyst carrier, and an Fe—Cr—Al based stainless steel sheet or double layered sheet with excellence in terms of wash coat loading property, high temperature stability and oxygen storage property, an Fe—Cr—Al based stainless steel sheet for fabrication of a catalyst carrier with an excellent temperature elevating property after engine start-up, i.e. with excellent exhaust gas purification performance, without radically reducing the sheet (foil) thickness and without the need for slit formation, a heating mechanism or a heat insulating mechanism, an Fe—Cr—Al based stainless steel sheet wherein the foil material has excellent high-temperature durability, allowing its use under stringent conditions exceeding 1000° C., an exhaust gas purification catalyst carrier honeycomb body employing the aforementioned Fe—Cr—Al based stainless steel sheet and double layered sheet, and a process for fabrication of a low heat capacity metal honeycomb body with sufficient oxidation resistance and excellent structural durability, even as a honeycomb body composed of an ultrathin foil.

The stainless steel sheet and double layered sheet of the invention both also encompass foils.

SUMMARY OF THE INVENTION

The present invention has been accomplished with the aim of solving the problems referred to above, and its gist is as follows.

(1) A high Al-containing Fe—Cr—Al based stainless steel sheet characterized by comprising, by weight, Cr: 10-30% and Al: >6.5%-15%, with the remainder consisting of Fe and unavoidable impurities.

(2) A high Al-containing Fe—Cr—Al based stainless steel sheet according to (1), characterized in that the steel sheet further comprises, by weight, Si: 0.1-1.0% and Mn: $\leqq 0.5\%$.

(3) A high Al-containing Fe—Cr—Al based stainless steel sheet according to (1) or (2), characterized in that the steel sheet further comprises, by weight, either or both Ti: 0.02-0.1% and Nb: 0.02-0.3%, as well as La: 0.01-0.1%, Ce: 0.01-0.1% and P: 0.01-0.05%.

(4) A high Al-containing Fe—Cr—Al based stainless steel sheet according to any one of (1) to (3), characterized in that the steel sheet further comprises, by weight, Cu: 0.01-1.0%.

(5) A high Al-containing Fe—Cr—Al based stainless steel sheet according to any one of (1) to (4), characterized in that the steel sheet further comprises, by weight, Mg: 0.001-0.1%.

(6) A high Al-containing Fe—Cr—Al based stainless steel sheet according to any one of (1) to (5), characterized in that the total of Zn, Sn, Sb, Bi and Pb in the steel sheet is limited to no greater than 0.05% by weight.

(7) A high Al-containing Fe—Cr—Al based stainless steel sheet according to any one of (1) to (6), characterized in that the thickness of the steel sheet is 10-40 μm.

(8) A high Al-containing double layered sheet characterized by comprising Al or an Al alloy adhering to the surface of a stainless steel sheet with a thickness of 5 μm to 2 mm, wherein the average composition is the composition of a high Al-containing Fe—Cr—Al based stainless steel sheet according to any one of (1) to (6).

(9) A high Al-containing double layered sheet according to (7), characterized in that the Al or Al alloy comprises at least one from among Si, Ca, Sr, Y, Zr, La, Ba, Mg, Ce, Hf and Ta.

(10) A high Al-containing double layered sheet according to (8) or (9), characterized in that the sheet thickness is 10-40 μm.

(11) A high Al-containing Fe—Cr—Al based stainless steel sheet according to (1), characterized in that the surface of the steel sheet has protrusions with a height of 1 μm or greater at a density of at least 100/cm$^2$, and a sheet thickness of no greater than 100 μm, and is used in an exhaust gas purification catalyst-carrying honeycomb body.

(12) A high Al-containing Fe—Cr—Al based stainless steel sheet according to (11), characterized in that the protrusions are made of metal, and the Al concentration in the protrusions is higher than the Al concentration in the steel sheet.

(13) A high Al-containing Fe—Cr—Al based stainless steel sheet according to (11) or (12), characterized in that the steel sheet further comprises, by weight, Si: 0.1-1.0% and Mn: $\leqq 0.5\%$.

(14) A high Al-containing Fe—Cr—Al based stainless steel sheet according to (13), characterized by further comprising, by weight, either or both Ti: 0.02-0.1% and Nb: 0.02-0.3%, as well as La: 0.01-0.1%, Ce: 0.01-0.1% and P: 0.01-0.05%.

(15) A high Al-containing Fe—Cr—Al based stainless steel sheet according to (1), characterized in that the steel sheet has isolated gaps in the interior and is used in an exhaust gas purification catalyst-carrying honeycomb body.

(16) A high Al-containing Fe—Cr—Al based stainless steel sheet according to (15), characterized in that the gaps are at positions within t/7 from the steel sheet surface in the sheet thickness direction of the steel sheet, where t is the thickness of the steel sheet.

(17) A high Al-containing Fe—Cr—Al based stainless steel sheet according to (15) or (16), characterized in that the sizes of the gaps are between 0.1 and 5 μm.

(18) A high Al-containing Fe—Cr—Al based stainless steel sheet according to any one of (15) to (17), characterized in that the thickness of the steel sheet is 10-40 μm.

(19) A high Al-containing Fe—Cr—Al based stainless steel sheet according to any one of (15) to (18), characterized in that the steel sheet further comprises, by weight, Si: 0.1-1.0% and Mn: $\leqq 0.5\%$.

(20) A high Al-containing Fe—Cr—Al based stainless steel sheet according to (19), characterized in that the steel sheet further comprises, by weight, either or both Ti: 0.02-0.1% and Nb: 0.02-0.3%, as well as La: 0.01-0.1%, Ce: 0.01-0.1% and P: 0.01-0.05%.

(21) A high Al-containing Fe—Cr—Al based stainless steel sheet according to (1), characterized in that the thickness t of the steel sheet is 10-40 μm, the thermal expansion coefficient α from 20° C. to 1000° C. is 15-23 μm/m/° C. and the 0.2% proof strength σ (N/mm$^2$) measured at 900° C., the steel sheet thickness t (μm) and the thermal expansion coefficient α (μm/m/° C.) are in a relationship satisfying the following inequality <1>, and the steel sheet is used in an exhaust gas purification catalyst-carrying honeycomb body.

$$\sigma \geqq (-9.0875 \times \alpha^2 + 4.2913 \times 10^2 \times \alpha - 3.84215 \times 10^3)/t \quad <1>$$

(22) A high Al-containing Fe—Cr—Al based stainless steel sheet according to (21), characterized in that the steel sheet further comprises, by weight, Si: 0.1-1.0% and Mn: $\leqq 0.5\%$.

(23) A high Al-containing Fe—Cr—Al based stainless steel sheet according to (21) or (22), characterized in that the steel sheet further comprises, by weight, either or both Ti: 0.02-0.1% and Nb: 0.02-0.3%, as well as La: 0.01-0.1%, Ce: 0.01-0.1% and P: 0.01-0.05%.

(24) A process for fabrication of a high Al-containing double layered sheet, characterized by adhering Al or an Al alloy to the surface of a stainless steel sheet with a thickness of 5 μm to 2 mm, wherein the average composition is a composition comprising Cr: 10-30% and Al: >6.5%-15%, with the remainder consisting of Fe and unavoidable impurities.

(25) A process for fabrication of a high Al-containing double layered sheet according to (24), characterized in that the average composition of the high Al double layered sheet further comprises, by weight, Si: 0.1-1.0% and Mn: ≦0.5%.

(26) A process for fabrication of a high Al-containing double layered sheet according to (24) or (25), characterized in that the average composition of the high Al double layered sheet further comprises, by weight, either or both Ti: 0.02-0.1% and Nb: 0.02-0.3%, as well as La: 0.01-0.1%, Ce: 0.01-0.1% and P: 0.01-0.05%.

(27) A process for fabrication of a high Al-containing double layered sheet according to any one of (24) to (26), characterized in that the average composition of the high Al double layered sheet further comprises, by weight, Cu: 0.01-1.0%.

(28) A process for fabrication of a high Al-containing double layered sheet according to any one of (24) to (27), characterized in that the average composition of the high Al double layered sheet further comprises, by weight, Mg: 0.001-0.1%.

(29) A process for fabrication of a high Al-containing double layered sheet according to any one of (24) to (28), characterized in that the total of Zn, Sn, Sb, Bi and Pb in the average composition of the high Al double layered sheet is limited to no greater than 0.05% by weight.

(30) A process for fabrication of a high Al-containing double layered sheet according to any one of (24) to (29), characterized in that the adhering Al or Al alloy comprises at least one from among Si, Ca, Sr, Y, Zr, Ba, La, Mg, Ce, Hf and Ta.

(31) A process for fabrication of a high Al-containing Fe—Cr—Al based stainless steel sheet, characterized by subjecting a high Al-containing double layered sheet obtained by a process according to any one of (24) to (30) to foil rolling.

(32) A process for fabrication of a high Al-containing Fe—Cr—Al based stainless steel sheet, characterized by subjecting a high Al-containing double layered sheet obtained by a process according to any one of (24) to (30) to diffusion heat treatment.

(33) A process for fabrication of a high Al-containing Fe—Cr—Al based stainless steel sheet, characterized by subjecting a high Al-containing double layered sheet obtained by a process according to any one of (24) to (30) to diffusion heat treatment and then to foil rolling.

(34) A process for fabrication of a high Al-containing Fe—Cr—Al based stainless steel sheet, characterized by subjecting the double layered sheet obtained by a process according to any one of (24) to (30) to foil rolling and then to diffusion heat treatment.

(35) A process for fabrication of a high Al-containing Fe—Cr—Al based stainless steel sheet according to any one of (31) to (34), characterized in that the thickness of the steel sheet is no greater than 40 μm.

(36) An exhaust gas purification catalyst-carrying honeycomb body, characterized by being fabricated using a high Al-containing Fe—Cr—Al based stainless steel sheet according to any one of (1) to (7) or a high Al-containing double layered sheet according to any one of (8) to (10).

(37) An exhaust gas purification catalyst-carrying honeycomb body, characterized by being fabricated using a high Al-containing Fe—Cr—Al based stainless steel sheet according to any one of (11) to (23).

(38) An exhaust gas purification catalyst-carrying honeycomb body, characterized by being fabricated using a high Al-containing double layered sheet obtained by a process according to any one of (24) to (30), or an Fe—Cr—Al based stainless steel sheet obtained by a process according to any one of (31) to (35).

(39) A process for fabrication of an exhaust gas purification catalyst-carrying honeycomb body, characterized by constructing a honeycomb body from an Fe—Cr—Al based stainless steel sheet comprising, by weight, Cr: 10-30% and Al: ≦6.5%, with the remainder consisting of Fe and unavoidable impurities, coating the surface of the steel sheet of the honeycomb body with Al powder, and then subjecting the steel sheet to diffusion heat treatment.

(40) A process for fabrication of an exhaust gas purification catalyst-carrying honeycomb body according to (39), characterized in that the steel sheet further comprises, by weight, Si: 0.1-1.0% and Mn: ≦0.5%.

(41) A process for fabrication of an exhaust gas purification catalyst-carrying honeycomb body according to (39) or (40), characterized in that the steel sheet further comprises, by weight, either or both Ti: 0.02-0.1% and Nb: 0.02-0.3%, as well as La: 0.01-0.1%, Ce: 0.01-0.1% and P: 0.01-0.05%.

(42) A process for fabrication of an exhaust gas purification catalyst-carrying honeycomb body according to any one of (39) to (41), characterized in that the coated Al powder comprises at least one from among Si, Ca, Sr, Y, Zr, Ba, La, Mg, Ce, Hf and Ta.

DETAILED DESCRIPTION OF THE INVENTION

Figure 1:
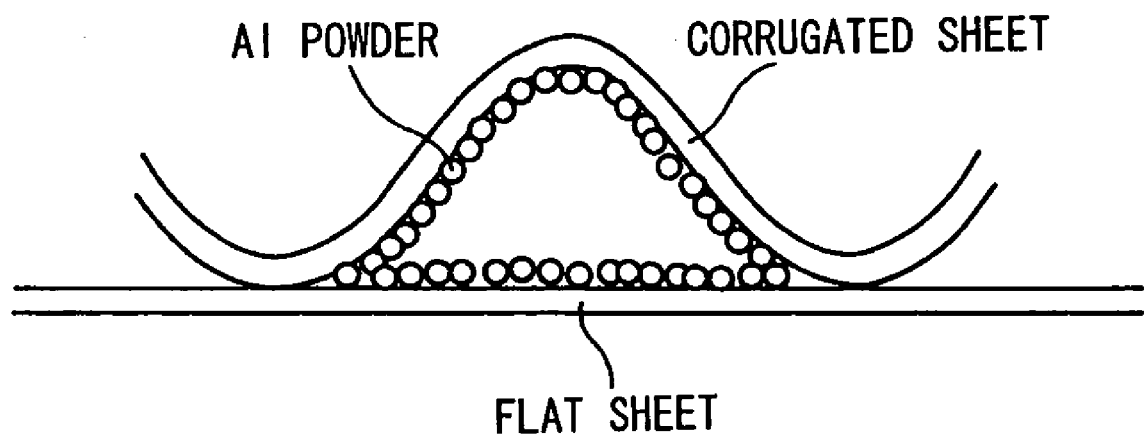
FIG. 1 is a cross-sectional view showing a state of Al powder accumulated on the cell walls of a honeycomb body.

The reasons for the component ranges in the Fe—Cr—Al based stainless steel sheet of the invention will now be explained. The units are weight percentages.

If the Al content exceeds 6.5% it will be possible to ensure oxidation resistance as a catalyst carrier even if the honeycomb body employs a thin steel sheet of 30 μm or smaller. However, the upper limit is 15% since an Al content of greater than 15% results in a fragile steel sheet.

A Cr content of 10% or greater produces oxidation resistance, and therefore the lower limit is 10%. An amount of greater than 30% results in a fragile steel sheet, and therefore the upper limit is 30%.

The Fe—Cr—Al based stainless steel sheet of the invention comprises the aforementioned alloy components, with the remainder consisting substantially of Fe and unavoidable impurities. As examples of unavoidable impurities there may be mentioned C: ≦0.01% and S: ≦0.005%.

The Fe—Cr—Al based stainless steel sheet of the invention also preferably comprises the following components.

A Mn content of no greater than 0.5% will ensure oxidation resistance of the steel sheet, and therefore Mn is preferably present at no greater than 0.5%.

Addition of Si at 0.1% or greater will improve the oxidation resistance, and therefore the lower limit is preferably 0.1%. If the Si content exceeds 1.0% the steel sheet will tend to become fragile, and therefore the upper limit is preferably 1.0%.

Either or both Ti: ≧0.02% and Nb: ≧0.02% will exhibit an effect of improving the hot rolled sheet ductility. On the other hand, amounts greater than Ti: 0.1% or Nb: 0.3% will tend to impair the oxidation resistance, and therefore these values are preferably the upper limits.

La and Ce both have an effect of improving the oxidation resistance. Oxidation resistance can be guaranteed if each is present at 0.01% or greater. A content of either exceeding 0.1% will result in segregation at the grain boundary and will adversely affect the hot workability, and therefore the upper limit is preferably 0.1%.

A P content of 0.01% or greater will allow formation of phosphides with La and Ce, with an effect of inhibiting La and Ce grain boundary segregation and improving the hot workability. The lower limit for the content is 0.01%, while the upper limit is preferably 0.05% since the oxidation resistance may be inferior at greater than 0.05%.

In an Fe—Cr—Al based stainless steel sheet with an Al content exceeding 6.5%, an oxidation film is formed during brazing treatment, thus impairing the wettability of the brazing material. A Cu content of 0.01% or greater will produce an effect of improving the brazing material wettability, and therefore Cu is preferably added at 0.01% or greater. On the other hand, a Cu content of greater than 1.0% will impair the hot workability, and therefore the upper limit is 1.0%. The range for the Cu content is more preferably 0.03% to 0.5%, and even more preferably 0.05% to 0.5%.

If the Mg content is 0.001% or greater, the low vapor pressure of Mg will result in fly off of Mg vapor during the brazing treatment, and this will provide an effect of breaking up the oxidation film and improving the brazing property. The Mg content is therefore preferably 0.001% or greater. On the other hand, excessive addition of Mg will impair the hot rolled sheet ductility of the steel sheet, and therefore the upper limit is 0.1%.

The Zn, Sn, Sb, Bi and Pb components may be present as impurities in the Fe—Cr—Al based stainless steel sheet. These elements have low melting points, and tend to segregate at the grain boundary to result in grain boundary cracking during slab solidification or hot rolling. In particular, an Al content of greater than 6.5% in the steel will increase the sensitivity to cracking of these elements. The total of Zn, Sn, Sb, Bi and Pb is preferably no greater than 0.05% to reduce the crack sensitivity.

As described in Japanese Examined Patent Publication HEI No. 6-8486, an Al content exceeding 6.5% in a stainless steel sheet forming a metal carrier will lead to fine cracks in the coating upon repeated heating of the steel sheet by exhaust gas. According to the invention it was discovered that cracking can be prevented by limiting the thickness of the stainless steel sheet to no greater than 40 μm. Therefore, in a metal carrier employing an Fe—Cr—Al based stainless steel sheet of the invention comprising Al at greater than 6.5%, cracking will be avoided if the stainless steel sheet thickness is 40 μm or smaller, even when the metal carrier is subjected to repeated heating. In addition, limiting the sheet thickness to no greater than 40 μm also reduces the heat capacity of the honeycomb structure, and therefore allows the light-off performance and purification performance to be improved when the honeycomb structure is used as a catalyst converter.

The high Al-containing double layered sheet of the invention will now be explained.

The high Al-containing double layered sheet of the invention is obtained by adhering Al or an Al alloy onto the surface of an Fe—Cr—Al based stainless steel sheet made of a base material to form an Al coating, and the average composition of the Fe—Cr—Al based stainless steel sheet base material and the Al coating is adjusted to match the composition of the aforementioned high Al-containing Fe—Cr—Al based stainless steel sheet. Thus, the reasons for the limitations on the amounts of Cr and Al in the double layered sheet, the amounts of Si and Mn added as optional components, the amounts of Ti, Nb, La and Ce, the amount of P, the amount of Cu added to improve the brazing material wettability, the amount of Mg added to improve the brazing property, and the total amount of Zn, Sn, Sb, Bi and Pb which is restricted in order to reduce the crack sensitivity, are the same as explained for the high Al-containing Fe—Cr—Al based stainless steel sheet described above, and will not be explained again.

Since, as mentioned above, the Al content of the Fe—Cr—Al based stainless steel as the base material of the double layered sheet may be adjusted to an average composition of 6.5-15% by the adhered Al coating, it may be a relatively low content of no more than 8%, or even 6.5%.

The thickness of the double layered sheet is not particularly restricted and may be appropriately selected according to the purpose of use. If it is too thin, the rigidity of the double layered sheet will be significantly reduced to the point of limiting its use, and therefore the thickness is preferably at least 5 μm. If it is too thick, however, the amount of adhered Al will need to be increased and peeling of the Al coating may become a problem, and therefore the thickness is preferably no greater than 2 mm. For use as the steel sheet of a honeycomb body in a metal carrier, it is preferably no greater than 40 μm, and more preferably 10-40 μm, as explained for the Fe—Cr—Al based stainless steel sheet described above.

The high Al-containing double layered sheet of the invention comprises Al or an Al alloy adhered to one or both sides of the surface of the Fe—Cr—Al based stainless steel sheet as the base material.

The Al or Al alloy adhered to the surface preferably comprises at least one from among Si, Ca, Sr, Y, Zr, Ba, La, Mg, Ce, Hf and Ta.

If the coating of the Al or Al alloy adhered to the surface comprises at least one from among Si, Ca, Sr, Y, Zr, Ba, La, Mg, Ce, Hf and Ta, improvement will be realized in the wash coat loading property, high temperature stability and oxygen storage property when an automobile exhaust gas purification catalyst is loaded in the honeycomb structure. Addition of these elements in an Al-based metal film comprising at least 40 wt % Al improves wettability with the wash coat solution, compared to the surface of stainless steel, and is effective for producing a more uniform wash coat. Furthermore, when these elements diffuse in the wash coat and form oxides, they effectively prevent α transformation of $Al_2O_3$ and enhance the oxygen storing effect. Since the wash coat layer is formed on both sides of the steel sheet, it is suitable for a double layered steel sheet having Al or an Al alloy on both sides. The content of each of these elements in the outer layer is preferably 0.01-15 wt %. The effect described above may not be exhibited at less than 0.01 wt %, while the steel sheet will tend to become brittle if greater than 20 wt %.

The Al or Al alloy adhered to the surface preferably comprises Fe at 1% or greater. This will inhibit vaporization of Al, thereby inhibiting Al loss and improving the oxidation resistance during the heat treatment for brazing of the honeycomb body or during the heat treatment for uniform diffusion of Al.

When the double layered sheet is subjected to heat treatment or foil rolling to diffuse the Al or Al alloy on the surface and produce a high Al-containing Fe—Cr—Al based stainless steel sheet as described hereunder, the Al or the aforementioned elements contained in the Al alloy on the surface are also present in the Fe—Cr—Al based stainless steel sheet, and therefore a similar effect can be obtained.

A high Al-containing stainless steel sheet of the invention will now be explained wherein the surface of the Fe—Cr—Al based stainless steel sheet (foil) comprises protrusions with a height of 1 μm or greater at a density of at least $100/cm^2$.

If protrusions with a height of 1 μm or greater are present on the surface of the honeycomb body steel sheet at a density of at least $100/cm^2$, the wash coat layer will have a better taper and the cohesion between the metal foil surface and wash coat layer will be improved, when the wash coat layer is formed on the honeycomb body. Since protrusions are present on the surface of the steel sheet forming the cell surfaces of the honeycomb body, the cell surfaces will be irregular, thus promoting turbulence of the gas passing through the cells, and this turbulence effect will accelerate replacement of the gas contacting with the cell surfaces, thereby promoting the catalyst reaction. The protrusions referred to here are wart-like projections extending from the steel sheet surface.

The heights of the protrusions formed on the steel sheet surface must be at least 1 μm. If they are smaller than 1 μm, an effect of increased wash coat adhesion will not be achieved. The protrusion heights are more preferably 2 μm or greater. The density of the protrusions must be at least $100/cm^2$. This can reliably increase the ameliorating effect on cohesion of the wash coat layer bearing the protrusions. The reason for the upper limit of 100 μm for the thickness of the steel sheet of the invention is that a thickness of greater than 100 μm will lead to excessive pressure loss upon formation of the honeycomb body.

Incidentally, if the surface roughness Ra of the honeycomb body, or the steel sheet composing the honeycomb body, is 2 μm or greater, it will be possible to improve the cohesion between the steel sheet surface and the wash coat layer when the wash coat layer is formed on the honeycomb body. Also, since irregularities are present on the surface of the steel sheet forming the cell surfaces of the honeycomb body, turbulence of the gas passing through the cells is promoted, and the turbulence effect accelerates replacement of the gas contacting with the cell surfaces, thereby promoting the catalyst reaction. The surface roughness is the value of Ra as specified by JIS S2000.

The surface roughness Ra of the steel sheet surface is preferably 2 μm or greater because this will allow the cohesive property of the wash coat layer to be exhibited. The surface roughness Ra is more preferably 4 μm or greater.

The steel sheet of the invention has protrusions on the surface and a prescribed surface roughness, to allow the aforementioned effect to be obtained when the steel sheet is used to form a honeycomb body.

The steel sheet or honeycomb body-forming steel sheet of the invention may be a steel sheet comprising, by weight, the components Al: >6.5%-15% and Cr: 10-30%, with the remainder consisting of Fe and unavoidable impurities. For improved oxidation resistance, the steel sheet used is preferably one whose components are Si: 0.1-1.0%, Mn: ≦0.5%, Al: >6.5%-15% and Cr: 10-30%, with the remainder consisting of Fe and unavoidable impurities.

Specifically, Mn is limited to no greater than 0.5% in order to ensure that the steel sheet will have oxidation resistance.

An Si content of 0.1% or greater can improve the oxidation resistance of the steel sheet. However, the steel sheet may become brittle if the Si content exceeds 1.0%, and therefore the upper limit is 1.0%.

An Al content of greater than 6.5% can also improve the oxidation resistance of the steel sheet. However, since the steel sheet may become brittle if the Al content exceeds 15%, the upper limit is 15%.

A Cr content of 10% or greater can also improve the oxidation resistance of the steel sheet. However, since the steel sheet may become brittle if the Cr content exceeds 30%, the upper limit is 30%.

The steel sheet or honeycomb body-forming steel sheet of the invention also preferably comprises either or both Ti: 0.02-0.1% and Nb: 0.02-0.3%, as well as La: 0.01-0.1%, Ce: 0.01-0.1% and P: 0.01-0.05%.

By including either or both Ti at 0.02% or greater and Nb at 0.02% or greater, it is possible to improve the ductility of the steel sheet. However, the upper limits are 0.1% for Ti and 0.3% for Nb, because exceeding these limits may adversely affect the oxidation resistance of the steel sheet.

By including La at 0.01% or greater and Ce at 0.01% or greater, it is possible to improve the oxidation resistance of the steel sheet. However, the upper limits are 0.1% for La and 0.1% for Ce, because exceeding these limits can lead to cracking during hot rolling.

A P content of 0.01% or greater has the effect of preventing cracking during hot rolling when La and Ce are present. However, the upper limit for the P content is 0.05%, because exceeding this limit can lead to inferior oxidation resistance.

A high Al-containing Fe—Cr—Al based stainless steel sheet (foil) according to the invention having isolated gaps in the interior of the Fe—Cr—Al based stainless steel sheet (foil) will now be explained.

The Fe—Cr—Al based stainless steel sheet (foil) of the invention is a stainless steel sheet (foil) comprising Al, and it is characterized by having isolated gaps in the interior of the steel sheet. The presence of the isolated gaps can increase the heat insulating property of the steel sheet. The result of the gaps formed in the interior of the steel sheet is a reduction in the heat conductivity near those areas. When a catalyst carrier is constructed using a honeycomb body comprising a steel sheet according to the invention, the heat of the exhaust gas during the initial engine start up period raises the temperature of the catalyst first before raising the temperature near the center of the steel sheet thickness, thereby increasing the temperature elevation rate of the catalyst itself and providing the catalyst carrier with excellent purification performance.

The high Al-containing stainless steel of the invention is preferably Fe—Cr—Al based stainless steel comprising Al: >6.5%-15% and Cr: 10-30%.

If the formed gaps are at positions within t/7 from the steel sheet surface, where t is the thickness of the steel sheet, an effect of reduced surface heat conductivity will be obtained according to the invention. Forming gaps toward the center end of t/7 of the sheet thickness will not provide a heat insulating effect on the steel sheet surface to a degree which will increase the temperature elevation rate of the catalyst. More preferably, formation of gaps within t/10 from the steel sheet surface will further reduce the heat conduction of the steel sheet surface, thereby further improving the temperature elevating property of the catalyst.

If the sizes of the gaps are smaller than 0.1 μm, it will be difficult to effectively reduce the heat conduction. They are preferably not larger than 5 μm because the strength near those areas will be reduced. The sizes of the gaps are therefore specified as being between 0.1 μm and 5 μm. The sizes are more preferably between 1 μm and 4 μm in order to facilitate the effect of the invention.

The effect of the invention will be achieved if the distances between the centers of the gaps according to the invention are preferably greater than L and no greater than 20L, where L is defined as the sizes of the gaps. This is because if the distances between the gaps are less than L, the gaps may become connected and in some cases too large to the point of reducing the steel sheet strength. If they are greater than 20L, the effect of the invention of reducing the heat conductivity of the steel sheet surface layer will be less prominent. The distances between the gaps are more preferably no greater than 10L for greater effectiveness.

The thickness of the steel sheet of the invention is preferably between 10 μm and 40 μm. If the thickness of the steel sheet is less than 10 μm, the honeycomb body fabricated using the steel sheet will lack strength. If the thickness of the steel sheet exceeds 40 μm, the heat capacity of the steel sheet itself will increase, thus diluting the effect of the invention.

The steel sheet and honeycomb body-forming steel sheet of the invention may be an Fe—Cr—Al based steel sheet (foil) comprising, by weight, the components Al: >6.5%-15% and Cr: 10-30%, with the remainder consisting of Fe and unavoidable impurities. For improved oxidation resistance, the steel sheet used is preferably one whose components are Si: 0.1-1.0%, Mn: ≦0.5%, Al: >6.5%-15% and Cr: 10-30%, with the remainder consisting of Fe and unavoidable impurities.

An Al content of greater than 6.5% can improve the oxidation resistance of the steel sheet. However, since the steel sheet may become brittle if the Al content exceeds 15%, the upper limit is 15%.

A Cr content of 10% or greater can also improve the oxidation resistance of the steel sheet. However, since the steel sheet may become brittle if the Cr content exceeds 30%, the upper limit is 30%.

Mn is limited to no greater than 0.5% in order to ensure that the steel sheet will have oxidation resistance.

An Si content of 0.1% or greater can improve the oxidation resistance of the steel sheet. However, the steel sheet may become brittle if the Si content exceeds 1.0%, and therefore the upper limit is 1.0%.

The steel sheet and honeycomb body-forming steel sheet of the invention also preferably comprises either or both Ti: 0.02-0.1% and Nb: 0.02-0.3%, as well as La: 0.01-0.1%, Ce: 0.01-0.1% and P: 0.01-0.05%.

By including either or both Ti at 0.02% or greater and Nb at 0.02% or greater, it is possible to improve the ductility of the steel sheet. However, the upper limits are 0.1% for Ti and 0.3% for Nb, because exceeding these limits may adversely affect the oxidation resistance of the steel sheet.

By including La at 0.01% or greater and Ce at 0.01% or greater, it is possible to improve the oxidation resistance of the steel sheet. However, the upper limits are 0.1% for La and 0.1% for Ce, because exceeding these limits can lead to cracking during hot rolling.

A P content of 0.01% or greater has the effect of preventing cracking during hot rolling when La and Ce are present. However, the upper limit for the P content is 0.05%, because exceeding this limit can lead to inferior oxidation resistance.

A honeycomb body constructed using a steel sheet with gaps according to the invention, when used as a catalyst carrier supporting a catalyst on the honeycomb cell surfaces, can serve as a catalyst carrier with an increased temperature elevation rate of the catalyst itself during initial engine startup, and therefore excellent purification performance.

A high Al-containing Fe—Cr—Al based stainless steel sheet according to the invention will now be explained, wherein the proof strength condition required for an Fe—Cr—Al based stainless steel sheet (foil) used in an exhaust gas purification catalyst carrier is specified by the relationship between the thickness and the thermal expansion coefficient of the steel sheet (foil).

A catalyst carrier which is performing exhaust gas purification treatment has a temperature gradient in which the temperature is higher at the center and lower at the periphery, in the radial direction. Moreover, a temperature gradient also exists in which the temperature of the exhaust gas is high at the inlet end and lower toward the outlet end, in the axial direction. The thermal expansion of the catalyst carrier differs due to this temperature gradient, and thermal stress acts inside the catalyst carrier as a result. In other words, a larger thermal expansion coefficient of the steel sheet used results in a greater thermal stress in the catalyst carrier during treatment.

The present invention was accomplished with this in mind, and it is characterized in that the proof strength condition required for the steel sheet is specified by the relationship between the thickness and the thermal expansion coefficient of the steel sheet. This allows the most preferred proof strength range to be specified for the actual thermal expansion coefficient of the steel sheet, to fabricate a steel sheet and honeycomb body having excellent high temperature durability even under stringent conditions exceeding 1000° C.

Specifically, the thickness t of the steel sheet of the invention is 10-40 μm, the thermal expansion coefficient α from 20° C. to 1000° C. is 15-23 μm/m/° C. and the 0.2% proof strength σ (N/mm$^2$) measured at 900° C., the steel sheet thickness t (μm) and the thermal expansion coefficient α (μm/m/° C.) are in a relationship satisfying the following inequality <1>.

$$\sigma \geq (-9.0875 \times \alpha^2 + 4.2913 \times 10^2 \times \alpha - 3.82415 \times 10^3)/t \qquad <1>$$

As mentioned above, the thickness, thermal expansion coefficient and high temperature proof strength of the steel sheet are controlled in order to improve the cold-heat durability of the honeycomb body (the durability in an environment with an alternately repeating high temperature/low temperature atmosphere), and provide a honeycomb body with excellent high temperature durability in a steel sheet temperature range exceeding 1000° C. Inequality <1> above is derived from numerous experimental data, and the reasons for the limits are as follows.

A thickness t of less than 10 μm will lead to buckling and crumbling, and therefore the lower limit is 10 μm. At greater than 40 μm the back pressure of the honeycomb body will be high and the resistance will increase against gas passing through the honeycomb body, and therefore the upper limit is 40 μm.

The lower limit for the thermal expansion coefficient α is 15 μm/m/° C. because at less than 15 μm/m/° C. the cold-heat properties will depend on the proof strength and the relational inequality of the invention will not apply. The lower limit for the thermal expansion coefficient α is preferably 16 μm/m/° C. Also, if it exceeds 23 μm/m/° C., the heat stress will be too great and sufficient durability will not be achieved even if the sheet has the proof strength specified by the relational inequality of the invention, and therefore the upper limit is 23 μm/m/° C.

The range of inequality <1> was specified because when the proof strength σ was less than the value at the right of inequality <1>, steel sheet tearing and collapsing occurred more frequently if the environment was repeatedly alternated from a high-temperature to low-temperature atmosphere, and therefore adequate durability was clearly not achieved. A larger thermal expansion coefficient of the steel sheet resulted in increased thermal stress on the honeycomb body when the catalyst carrier was used, and therefore the lower limit for the required proof strength is also a large value.

The steel sheet and honeycomb body-forming steel sheet of the invention may be an Fe—Cr—Al based steel sheet (foil) comprising, by weight, the components Al: >6.5%-15% and Cr: 10-30%, with the balance consisting of Fe and unavoidable impurities. For improved oxidation resistance, with a proof strength σ value satisfying inequality <1> above, the steel sheet used is preferably one whose components are Si: 0.1-1.0%, Mn: ≦0.5%, Al: >6.5%-15% and Cr: 10-30%, with the remainder consisting of Fe and unavoidable impurities.

An Al content of greater than 6.5% can improve the oxidation resistance of the steel sheet. However, since the steel sheet may become brittle if the Al content exceeds 15%, the upper limit is 10%.

A Cr content of 10% or greater can also improve the oxidation resistance of the steel sheet. However, since the steel sheet may become brittle if the Cr content exceeds 30%, the upper limit is 25%.

Mn is limited to no greater than 0.5% in order to ensure that the steel sheet will have oxidation resistance.

An Si content of 0.1% or greater can improve the oxidation resistance of the steel sheet, and therefore the lower limit is 0.1. However, the steel sheet may become brittle if the Si content exceeds 1.0%, and therefore the upper limit is 1.0%.

The steel sheet and honeycomb body-forming steel sheet of the invention also preferably comprise either or both Ti: 0.02-0.1% and Nb: 0.02-0.3%, as well as La: 0.01-0.1%, Ce: 0.01-0.1% and P: 0.01-0.05%.

By including either or both Ti at 0.02% or greater and Nb at 0.02% or greater, it is possible to improve the ductility of the steel sheet. However, the upper limits are 0.1% for Ti and 0.3% for Nb, because exceeding these limits may adversely affect the oxidation resistance of the steel sheet.

By including La at 0.01% or greater and Ce at 0.01% or greater, it is possible to improve the oxidation resistance of the steel sheet. However, the upper limits are 0.1% for La and 0.1% for Ce, because exceeding these limits can lead to cracking during hot rolling.

A P content of 0.01% or greater has the effect of preventing cracking during hot rolling when La and Ce are present. However, the upper limit for the P content is 0.05%, because exceeding this limit can lead to inferior oxidation resistance.

The steel sheet of the invention is preferably a steel sheet for a metal catalyst carrier with excellent high temperature durability.

By using a honeycomb body constructed using the steel sheet of the invention as a catalyst carrier supporting a catalyst on the cell surfaces of the honeycomb, it is possible to obtain a catalyst carrier having excellent high temperature durability which can be used under stringent conditions exceeding 1000° C.

An exhaust gas purification catalyst-supporting honeycomb body constructed using a high Al-containing Fe—Cr—Al based stainless steel sheet according to the invention will now be explained.

A honeycomb body is formed using the high Al-containing Fe—Cr—Al based stainless steel sheet, or an alternately stacked laminate of a high Al-containing flat double layered sheet and a corrugated sheet obtained by corrugating the flat sheet, or a wound cylinder comprising the flat sheet alternately stacked with the corrugated sheet. Such honeycomb bodies are constructed by housing these forms in a jacket and fitting and anchoring the honeycomb body therein, or by bonding the points of contact between the flat sheet and corrugated sheet of the honeycomb body.

Such steel sheets (foils) used may, of course, be fabricated by the method of the invention described below.

Also, needless to mention, a honeycomb body may be obtained in the same manner described above using a high Al-containing Fe—Cr—Al based stainless steel sheet of the invention having protrusions on the surface, a high Al-containing Fe—Cr—Al based stainless steel sheet of the invention having gaps in the interior or a high Al-containing Fe—Cr—Al based stainless steel sheet of the invention having the proof strength specified by the relationship between the steel sheet (foil) thickness and thermal expansion coefficient.

When such a honeycomb body is used to make an exhaust gas purification catalyst carrier, a wash coat layer is usually formed on the honeycomb body surface for support of the catalyst, and the catalyst is supported therein.

A process for fabrication of a high Al-containing Fe—Cr—Al based stainless steel sheet of the invention with an Al content exceeding 6.5% and a high Al-containing double layered sheet will now be explained.

Since Fe—Cr—Al stainless steel having an Al content exceeding 6.5% has a low hot workability and low hot rolled ductility, it cannot be satisfactorily rolled in an ordinary steel-making/rolling process without increasing the number of passes during rolling. On the other hand, increasing the number of passes naturally increases the rolling cost.

According to the invention, the Al content in the stainless steel sheet is a low value prior to hot rolling, and an Al or Al alloy coating is formed on the surface of the steel sheet at least after completion of the hot rolling or after completion of cold rolling and after foil rolling, to prepare a high Al-containing double layered sheet wherein the average composition between the base stainless steel sheet (base material) and the surface Al coating is the composition of Fe—Cr—Al stainless steel according to the invention.

The double layered sheet of the invention may be obtained by adhering Al or an Al alloy on the surface of the Fe—Cr—Al stainless steel sheet as the base material to form an Al coating, by publicly known means including plating such as hot dipping or electrolytic plating, or a dry process such as vapor deposition, ion plating, sputtering, CVD or the like. The coating may be formed on one side or both sides of the base material surface. Rolling can be carried out without very high cost if the Al concentration of the stainless steel sheet prior to the Al coating formation is no greater than 8%, but rolling costs can be further reduced by limiting the concentration to no greater than 6.5%. For use as a double layered sheet, therefore, a high Al-containing double layered sheet may be fabricated by rolling the base material used to an appropriate sheet thickness, such as up to 40 μm, to prepare a steel sheet as the base material, and then forming an Al coating thereover.

After forming the Al coating of the double layered sheet, or after further rolling, the double layered sheet may be subjected to diffusion annealing to diffuse the surface Al into the stainless steel, to produce a stainless steel sheet having an Al content according to the invention. Since the Al content is low during hot rolling, it is possible to carry out satisfactory hot rolling without increasing the number of passes for rolling. If cold rolling or foil rolling is carried out prior to the diffusion annealing, it will be possible to accomplish satisfactory rolling without increasing the number of passes even for the cold rolling or foil rolling.

In this case, the thickness of the stainless steel sheet prior to the Al coating formation is preferably 0.005-2 mm. At less than 0.005 mm, the rigidity of the sheet will be notably reduced, making it difficult to form a honeycomb body. The upper limit is 2 mm because if the sheet thickness is greater than 2 mm, it will be necessary to increase the Al coating thickness, leading to such problems as peeling of the Al coating.

The process for fabricating the stainless steel sheet using a double layered sheet of the invention or the process for fabricating the honeycomb body may be selected from among the following modes.

As a first fabrication process, the Al coating-adhered stainless steel sheet may be fabricated as a high Al-containing double layered sheet of the invention. This may be used directly to form a honeycomb body, and then the honeycomb body may be subjected to diffusion annealing for diffusion of Al into the stainless steel sheet.

As a second fabrication process, a double layered sheet comprising an Al coating-adhered stainless steel sheet may be subjected to foil rolling to fabricate a high Al-containing Fe—Cr—Al based stainless steel sheet of the invention. The steel sheet (foil) may then be used to form a honeycomb body, and the honeycomb body subjected to diffusion annealing for diffusion of Al into the stainless steel sheet.

As a third fabrication process, a double layered sheet comprising an Al coating-adhered stainless steel sheet may be subjected to diffusion annealing for diffusion of Al into the stainless steel sheet to fabricate a high Al-containing Fe—Cr—Al based stainless steel sheet of the invention. The stainless steel sheet may then be used to form a honeycomb body.

As a fourth fabrication process, a high Al-containing double layered sheet comprising an Al coating-adhered stainless steel sheet may be subjected to diffusion annealing for diffusion of Al into the stainless steel sheet, and then the stainless steel sheet subjected to foil rolling to obtain a high Al-containing Fe—Cr—Al based stainless steel sheet of the invention. The steel sheet (foil) may then be used to form a honeycomb body.

As a fifth fabrication process, a high Al-containing double sheet comprising an Al coating-adhered stainless steel sheet may be subjected to foil rolling, and then the foil subjected to diffusion annealing for diffusion of Al into the stainless steel sheet to obtain a high Al-containing Fe—Cr—Al based stainless steel sheet of the invention. The steel sheet (foil) may then be used to form a honeycomb body.

A process for fabrication of a high Al-containing Fe—Cr—Al based stainless steel sheet (foil) having protrusions with a height of 1 µm or greater at a density of at least 100/cm$^2$ according to the invention will now be explained.

The means for adhering Al onto the stainless steel sheet surface may be a method of applying Al paint onto the steel sheet surface. A paint comprising Al powder, a resin and a solvent is prepared. The Al powder used may have a mean particle size of about 0.1-50 µm. Using flakes as the Al powder can provide a more preferred effect. The resin is necessary for anchorage onto the cell wall surfaces after the solvent has evaporated by drying. The resin used may be a common one such as an ethyl cellulose or phenol resin. The solvent used may be industrial kerosene or xylene. The amount of solvent used is important for management of the viscosity of the paint. A satisfactory result is achieved if the viscosity of the paint is kept between 10-5000 cp. The paint is applied onto the steel sheet surface. The application method may be a method involving immersion of the honeycomb body in the paint solution. The paint-coated steel sheet is then heat treated. The heat treatment atmosphere may be air or an inert atmosphere, but it is preferably an inert atmosphere. In order to melt the Al powder, the heat treatment temperature must be 600° C. or higher. When the resin is included in the paint, the heat treatment will result in thermal decomposition and removal of the resin.

The heat treatment of the paint-coated steel sheet results in melting of the Al powder in the paint and formation of numerous molten Al droplets on the steel sheet surface. The components in the steel sheet diffuse into the molten Al droplets from the sections of the steel sheet in contact with the droplets, and these components form an alloy with Al in the droplets and solidify. If the temperature of the steel sheet is lowered in this state, the droplets will form protrusions. The protrusions formed in this manner are composed of metal. The composition of the protrusions has a higher Al concentration than the Al concentration of the steel sheet.

The protrusions on the steel sheet surface formed by the method described above can have heights of 1 µm or greater, and the density of the protrusions may be 100/cm$^2$ or higher.

A portion of the Al powder in the paint applied onto the steel sheet surface forms numerous molten Al droplets on the steel sheet surface as described above, eventually forming protrusions. The rest of the Al powder melts during the heat treatment and diffuses into the steel sheet, forming an alloy with the constituents of the steel sheet.

For fabrication of a high Al-containing stainless steel sheet according to the invention, generally a continuous cast slab is subjected to hot rolling and then to cold rolling to obtain a steel sheet. If the Al content of the cast slab before hot rolling is greater than 6.5%, the hot rolling workability will be impaired, and satisfactory rolling will not be possible. According to the invention, the Al content of the cast slab before hot rolling was kept to no greater than 6.5%, paint comprising Al powder was applied onto the surface at the steel sheet stage, and heat treatment accomplished diffusion of Al into the steel sheet, thereby producing a steel sheet with an Al content of greater than 6.5%. An Al content exceeding 6.5% will allow the steel sheet to exhibit very satisfactory oxidation resistance.

The application of Al powder onto the steel sheet surface may be carried out on the steel sheet prior to formation of the honeycomb body, as explained above, but it is more preferably carried out on the steel sheet after formation of the honeycomb body. The application of Al powder onto the surface of the steel sheet forming the honeycomb body may be accomplished as described above, by immersing the honeycomb body in a paint comprising the Al powder, resin and solvent. Alternatively, an adhesive may be applied onto the surface of the steel sheet forming the honeycomb body, and then Al powder sprinkled on the honeycomb body to adhere the Al powder onto the adhesive-coated sections of the steel sheet surface. By heat treating the honeycomb body after application of the Al powder, it is possible to form protrusions on the surface of the steel sheet forming the honeycomb body, in a similar manner as the steel sheet described above, while simultaneously increasing the Al content of the steel sheet. The heat treatment may be conducted under the same conditions as the heat treatment for the steel sheet described above, or it may be combined with the heat treatment for brazing of the steel sheet contact sections of the honeycomb body.

A process for fabrication of a steel sheet having a steel sheet surface roughness Ra of 2 μm or greater will now be explained.

Al is vacuum vapor deposited on the surface of the steel sheet. The vapor deposition thickness may be an average thickness of 1 μm or greater under conditions with a film-forming speed of at least 0.5 μm/min. The steel sheet is heat treated after the Al vapor deposition. Heat treatment of the steel sheet having an Al coating on the surface can roughen the surface of the steel sheet and provide a roughness degree Ra of 2 μm or greater. The heat treatment conditions may be, for example, heat treatment for 2 hours in a vacuum atmosphere at about 1000° C. The heat treatment may be carried out on the steel sheet prior to honeycomb body formation, or after formation of the Al-deposited steel sheet into a honeycomb body.

The Al coating formed on the steel sheet surface has an effect of increasing the surface roughness of the steel sheet as mentioned above, but the diffusion of Al into the steel sheet during heat treatment also has an effect of increasing the Al content of the steel sheet. Thus, by limiting the Al content before hot rolling to no greater than 6.5% and heat treating the steel sheet after forming the Al coating, it is possible to increase the Al content of the steel sheet to above 6.5%.

The means for forming the Al coating on the surface of the steel sheet may be vacuum vapor deposition of Al on the steel sheet surface, or Al plating on the surface of the metal sheet before it is foil rolled, followed by foil rolling.

This method may be employed to increase the surface roughness Ra of the steel sheet to 2 μm or greater.

A process for fabrication of a high Al-containing Fe—Cr—Al based stainless steel sheet (foil) of the invention having isolated gaps in the interior will now be explained.

When an Al alloy is coated onto the stainless steel sheet serving as the base material and heat treatment is carried out to diffuse the Al on the surface into the stainless steel sheet base material, careful formulation of the alloy composition will allow formation of gaps in the steel sheet interior after diffusion. The gaps are formed by the difference in the diffusion rate of each element composing the Al alloy on the surface into the base material, and they are known as Kirkendall voids, which are formed near the bonding interface between the base material and the Al alloy. The present inventors succeeded in fabricating a steel sheet having isolated gaps in the interior according to the invention by controlling formation of the gaps.

The stainless steel sheet serving as the base material comprises Cr at 10-30%, with an Al content of no greater than 6.5 wt %. It may also be free of Al. By coating the base material surface with an Al alloy and then subjecting it to diffusion heat treatment, Al will diffuse into the steel sheet, yielding the prescribed Al content of, for example, greater than 6.5% and no greater than 15%. The Al content of the base material is limited to no greater than 6.5 wt % because a content of no greater than 6.5% will allow hot rolling and cold rolling to be satisfactorily carried out.

The components of the Al alloy applied to the surface of the base material are selected based on the following concept. Specifically, gaps according to the invention can be effectively formed during the diffusion heat treatment by using an Al alloy composition wherein the inward diffusion rate of each atom of the applied Al alloy into the steel sheet is as different as possible from the outward diffusion rate of each atom of the base material toward the steel sheet surface. In order to form gaps closer to the surface of the steel sheet, it is sufficient if the inward diffusion rate is greater than the outward diffusion rate. For this purpose, an element may be included which is an element from the applied Al alloy having a relatively fast rate of diffusion in Al, and mixing relatively uniformly with low segregation in the base material. For example, Si, Be, Co, Cr, Mg, Zr and the like are highly effective for forming gaps according to the invention. An Al alloy containing these added elements can be applied onto the base material relatively easily.

The base material may be used directly in the form of a flat steel sheet, or it may be used in the form of a honeycomb body. The Al alloy is applied to the surface of the base material by hot dipping, electrolytic plating, powder coating, a dry process or the like. The thickness of the application is determined based on the Al composition of the base material and on the target Al composition to be finally obtained as a result of the heat treatment diffusion. Diffusion heat treatment of the base material with the Al alloy applied to the surface results in formation of isolated gaps inside the steel sheet.

Since the positions in which the gaps are formed in the direction of thickness of the steel sheet are near the interface between the base material and the Al alloy, the thickness of the base material and the thickness of the applied Al alloy may be controlled for adjustment. When the positions of the gaps are positioned near the surface of the steel sheet, the Al content of the base material may be increased and the applied Al alloy thickness reduced. In this manner, it is possible to control the positions of the gaps in the sheet thickness direction, while maintaining the target Al content after diffusion heat treatment. Alternately repeating the Al alloy application and the diffusion heat treatment will allow control of the thickness of the gap layer in the direction of the sheet thickness. Thus, it is possible to fabricate a steel sheet having gaps at preferred positions in the direction of thickness, as explained above.

The gaps of the invention are formed by diffusion heat treatment after application of the Al alloy into the base material, and the sizes of the gaps may be controlled by adjusting the temperature and time of the diffusion heat treatment. If the heat treatment is carried out in a temperature range wherein the inward diffusion rate of each atom of the applied Al alloy is greater than the outward diffusion rate of each element in the base material, the sizes of the gaps can be relatively easily controlled by the heat treatment time. When finer gaps are to be formed, the control will be accomplished more easily by approximately matching the inward diffusion rate and the outward diffusion rate. The distances between the gaps are controlled mainly by the heat treatment time. The heat treatment time may be shortened in order to obtain narrower distances, and the heat treatment time may be lengthened in order to obtain wider distances.

The thickness of the base material for application of the Al alloy may be about 10 μm to about 500 μm. If the thickness of the base material before Al application is greater than 70 μm, it may be reduced to the prescribed thickness by rolling or the like with the Al alloy applied to the base material, and heat treatment carried out to form the gaps while diffusing the Al. Formation of the prescribed gaps by heat treatment may be followed by rolling or the like in order to reduce the sheet thickness to a prescribed value, but in this case the rolling percentage is preferably no greater than about 50% so as to avoid crushing the formed gaps.

A process for fabrication of a high Al-containing Fe—Cr—Al based steel sheet (foil) according to the invention will now be explained, wherein the proof strength condition required for an Fe—Cr—Al based steel sheet (foil) to be used in a honeycomb body of an exhaust gas purification catalyst carrier is specified by the relationship between the thickness and the thermal expansion retention of the steel sheet (foil).

It is known that for fabrication of an Fe—Cr—Al based stainless steel sheet, hot rolling becomes difficult to accomplish if the Al content before steel sheet rolling is greater than 6.5%. The preferred component range of the steel sheet of the invention is an Al content of >6.5%-15%, but it is difficult to produce a steel sheet having such a high Al concentration by direct hot rolling from a cast slab comprising the components described above.

According to the invention, a steel sheet with an Al content of less than 6.5% (hereinafter referred to as "base material") or a honeycomb body employing the steel sheet is formed, Al is adhered to the steel sheet of the base material or the steel sheet surface of the honeycomb body, and then diffusion heat treatment is carried out to increase the Al content in the steel sheet, in order to yield Fe—Cr—Al based stainless steel comprising Al as required for the invention. The Al adhesion is carried out during the cold rolled sheet stage before foil rolling, and it may be diffused at that stage, or the Al-adhered cold rolled sheet may be subjected to foil rolling. The steel sheet before Al adhesion has an Al content of less than 6.5%, and is therefore suitable for hot rolling. The relationship between the Al adhesion thickness and the base material thickness may be determined based on the difference between the amount of Al in the base material and the target amount of Al after heat diffusion, so that the difference in the Al amounts matches the amount of Al enriched by diffusion.

When the steel sheet is used for fabrication of a honeycomb body to be employed as a catalyst carrier, flat and corrugated sheets of the steel sheet are alternately wound or laminated into a honeycomb form, and the points of contact between the flat and corrugated sheets of the honeycomb body are brazed to form a firm honeycomb body. The bonding strength at the brazed sections of the honeycomb body of the invention is preferably 5 t (N/cm) or greater per centimeter of bonding line, where t (μm) is the thickness of the steel sheet used. The bonding method used may be a diffusion bonding method instead of a brazing method.

On the other hand, if Al is adhered on the surface of the stainless steel sheet serving as the base material, a multilayer structured steel flat sheet and corrugated sheet are wound or laminated to form a honeycomb body and the points of contact between the flat and corrugated sheets are bonded so that the Al and brazing material on the stainless steel sheet surface react during the high-temperature heat treatment for brazing, producing high-melting-point intermetallic compounds which often impair the bondability at the brazed sections.

According to the invention, one of the following three processes a) to c) is selected as the process for fabrication of the honeycomb, in order to allow fabrication of a honeycomb body with excellent bonding strength at the brazed sections.

a) According to this process, a base material with a low Al content is brought through to the cold rolling stage, an Al coating is formed on the cold rolled sheet surface, and the cold rolled sheet is heat treated in a high-temperature atmosphere for diffusion of Al into the base material, after which foil rolling is carried out, the steel sheet is used to form a honeycomb body, and the points of contact between the steel sheet of the honeycomb body are brazed. Since the steel sheet has a low Al content up to the cold rolling stage, it is possible to satisfactorily carry out hot rolling. Also, since an Al coating is formed on the cold rolled steel sheet surface prior to diffusion treatment, it is possible to ensure a suitable Al content according to the invention in the steel sheet. The Al coating is not present on the steel sheet surface during honeycomb body formation, and therefore firm bonded sections can be formed by brazing in the subsequent step. The method for forming the Al coating on the surface of the cold rolled steel sheet may be a method of hot dipping, electrolytic plating, powder coating, a dry process (vapor deposition, etc.) or the like.

b) According to this process, a base material with a low Al content is brought through to the foil rolling stage, an Al coating is formed on the surface of the steel sheet base material, and on the exterior there is formed a metal layer, such as an Fe layer, which reacts with the brazing material at a higher temperature than Al and can be brazed. The steel sheet having such a multilayer structure is used to form a honeycomb body, and then the points of contact between the steel sheets are bonded by brazing. Since the exterior of the Al coating is coated with an Fe layer so that the surface of the Al coating is not exposed, the brazing material at the bonding sections does not contact directly with the Al coating, and reaction between the brazing material and Al can thereby be controlled.

c) According to this process, first a steel sheet is prepared using a base material with a low Al content, the steel sheet is used to form a honeycomb body, and the points of contact between the steel sheet of the honeycomb body are brazed. Al powder is then adhered to the surface of the steel sheet of the honeycomb body, and the entire honeycomb body is subjected to high-temperature heat treatment for diffusion of the Al into the steel sheet. Since no Al coating is present on the surface of the steel sheet when the steel sheet is used to form the honeycomb body, and the points of contact between the steel sheet are maintained in a satisfactory state of contact during the brazing stage, it is possible to accomplish brazing in a sufficient manner. The Al powder is subsequently adhered onto the surface of the steel sheet and subjected to diffusion heat treatment, and therefore the steel sheet of the honeycomb body has an Al content which is suitable for the invention. The method of adhering the Al powder may be carried out by immersing the honeycomb body in a paint comprising the Al powder and a solvent, or by applying an adhesive onto the cell surfaces of the honeycomb body and then sprinkling the Al powder onto the honeycomb structure to adhere the Al powder onto the adhesive-applied sections of the cell surfaces.

In process c) above, the Al content of the stainless steel sheet before the honeycomb body formation is no greater than 6.5%, and the Cr content is 10-30%.

Also, the Fe—Cr—Al based stainless steel sheet (foil) of the honeycomb body prior to formation of the Al-adhered layer further comprises, by weight, Si: 0.1-1.0% and Mn: ≦0.5%, or may further comprise either or both Ti: 0.02-0.1% and Nb: 0.02-0.3%, as well as La: 0.01-0.1%, Ce: 0.01-0.1% and P: 0.01-0.05%, as explained above.

The adhering Al powder may also contain at least one from among Si, Ca, Sr, Y, Zr, Ba, La, Mg, Ce, Hf and Ta.

Process c) will now be explained in greater detail.

As shown in FIG. 1, in this method the metal Al powder is adhered onto the surface of the Fe—Cr—Al based alloy steel sheet composing the honeycomb body, and the Al is alloyed with the base material components during the heating process so that it diffuses into the base material to increase the Al concentration of the base material. The important aspect of the invention is that metal Al is adhered to the honeycomb body after the honeycomb body has been constructed from at least the flat and corrugated steel sheets, or from corrugated steel sheets.

Figure 2:
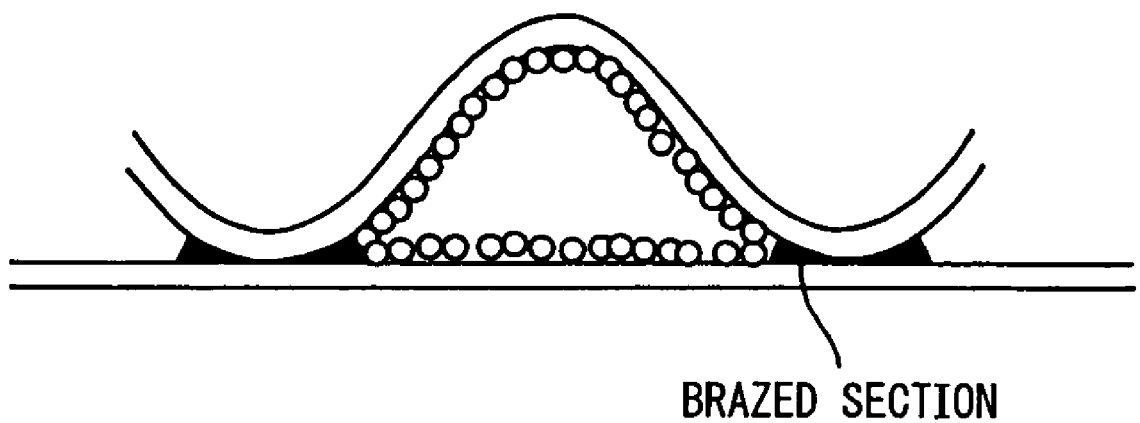
FIG. 2 is a cross-sectional view showing a state of Al powder accumulated on the cell walls and brazed sections of a honeycomb body.

Although heat treatment is usually carried out for a honeycomb body in order to bond the flat sheet and corrugated sheet, the adhesion of metal Al is carried out before or after the bonding heat treatment. When the bonding method is brazing, and the Al adhesion is carried out after the bonding heat treatment, the metal Al may also be adhered in the same manner to the brazing sections, as shown in FIG. 2. When it is carried out before the bonding heat treatment, the metal Al may be adhered after the brazing material has been situated at the brazing sections.

The honeycomb body fabrication process may be divided generally into a binder coating step, a powder adhering step, a drying step and a heat treatment step. Of these, the binder coating step and powder adhering step are accomplished by a single combined step of applying an Al powder paint. The drying step and heat treatment step may also be accomplished by a single combined step of drying included within the heat treatment step.

Figure 3:
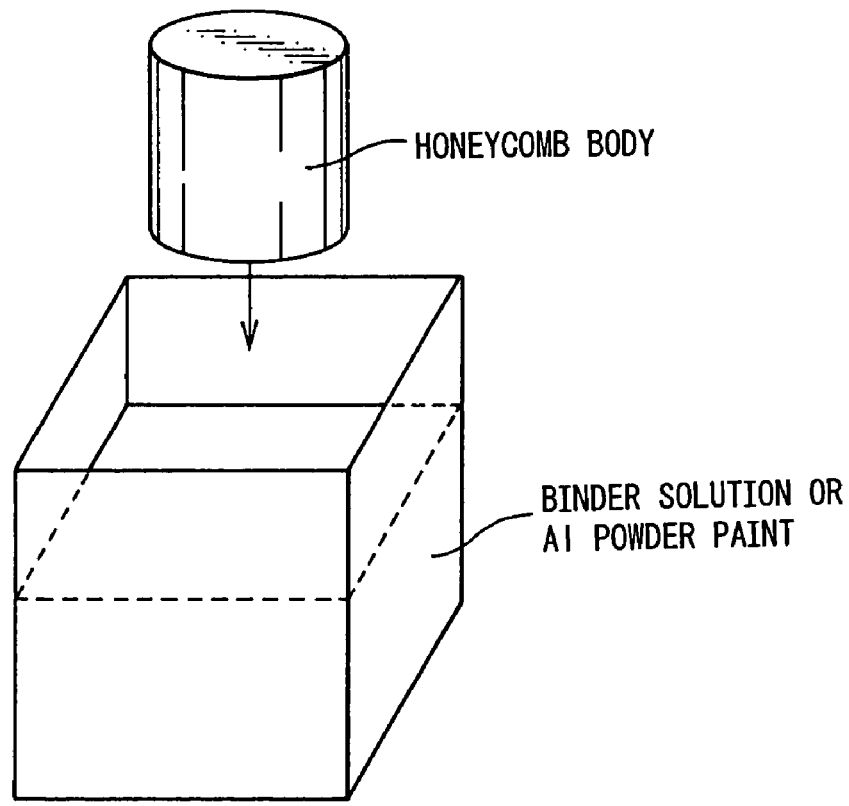
FIG. 3 is a perspective view showing an embodiment of a step in which a honeycomb body is immersed in a binder solution or Al powder slurry.

1) Binder Coating Step (FIG. 3)

This is a step of coating the binder to adhere the Al powder onto the honeycomb body. The binder used may be a binder solution comprising a binder component which can affix the powder after evaporation of the solvent, such as an aqueous solution of PVA or an acrylic acid-based polymer, or an organic binder comprising ethyl cellulose dissolved in an organic solvent.

Figure 4:
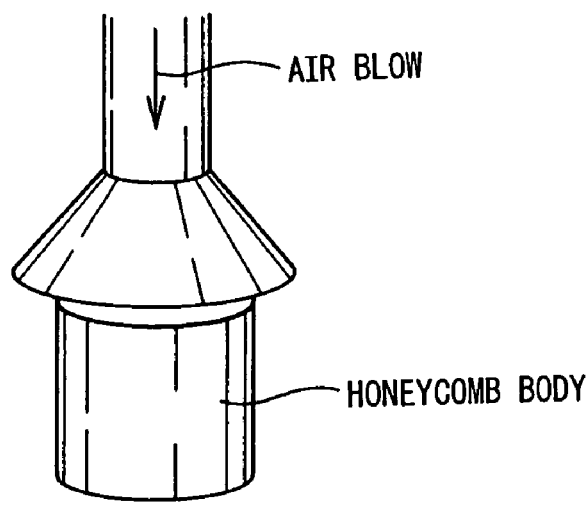
FIG. 4 is a schematic view showing an embodiment of a step in which excess binder or Al powder slurry is removed using an air blower.
Figure 5:
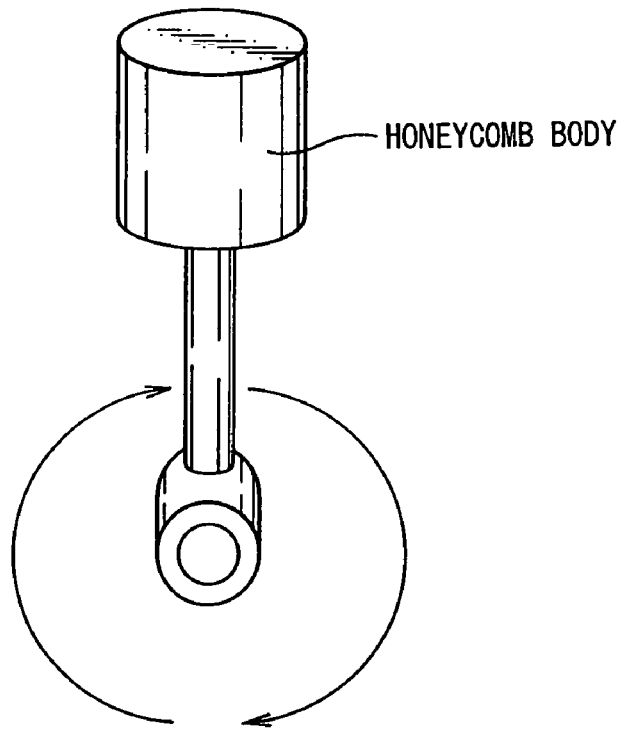
FIG. 5 is a schematic view showing an embodiment of a step in which excess binder or Al powder slurry is removed by applying centrifugal force.

As one example of a coating method, the honeycomb is immersed in a PVA aqueous solution to adhere the binder onto the cell walls of the honeycomb, after which the excess binder solution in the cells must be removed. The removal method is preferably, as shown in FIG. 4, a method of casting a high-speed gas flow against the honeycomb body in the direction of the cell lengths and air blowing the excess binder solution, or, as shown in FIG. 5, a method of subjecting the honeycomb to centrifugal force in the direction of the cell lengths to spin off the excess binder solution.

2) Al Powder Dispersing Step

Figure 6:
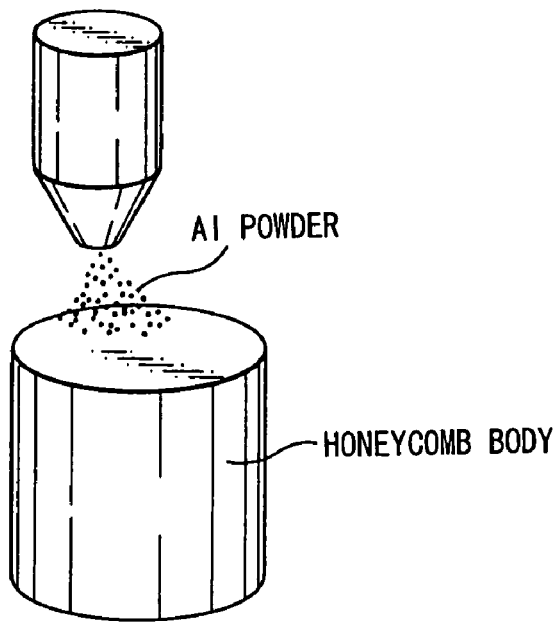
FIG. 6 is a schematic view showing an embodiment of a step in which Al powder is dispersed in a honeycomb body.

This is a step of adhering the powder onto the cell walls of the honeycomb body coated with the binder solution. As shown by the example in FIG. 6, the powder is dispersed from at least one side of the honeycomb. If the form of the powder used, and particularly the form of the Al powder used, is a flake powder having a particle size/thickness ratio of 10 or greater and a particle size of 1 μm or greater based on spherical size, the powder will aggregate less easily and therefore the flow property of the powder will be satisfactory and uniform coating will be accomplished on the coating surface, thereby giving a desirable result. With a particle size exceeding 50 μm based on spherical size, the flow property will be adequate but the powder will be large with respect to the sheet thickness, thereby increasing the heat capacity of the honeycomb. If possible, the particle size based on spherical size is more preferably no greater than the sheet thickness.

3) Al Powder Paint Application Step

This is a process in which steps 1) and 2) are carried out simultaneously, with the advantage of shortening the process. Specifically, this is realized by dispersing the Al powder in a solvent to prepare a paint, dipping the honeycomb in the paint in the same manner as step 1) shown in FIGS. 4 to 6, and removing the excess slurry in the cells. The Al paint is generally composed of Al powder, a resin (ethyl cellulose, acryl, phenol or the like) and a solvent. A satisfactory result can be obtained if the viscosity of the Al paint is kept between 10-5000 mPa·s. If the paint used comprises flaky Al powder with a particle size/thickness ratio of 10 or greater, it will be possible to regularly and uniformly cover the cell wall surfaces of the honeycomb body with the Al powder, for a suitable result. The Al particle size is preferably 1 μm or greater based on spherical size. For the same reason mentioned above, the upper limit is no greater than 50 μm and preferably no greater than the sheet thickness.

The method for removing the excess paint is preferably a method using an air blower, or a method of subjecting the honeycomb to centrifugal force in the direction of the cell lengths to spin off the excess binder solution.

4) Drying Step and Heat Treatment Step

This is a step wherein the honeycomb body in which the Al powder has been accumulated on the cell walls using a combination of steps 1) and 2) above, or step 3), is dried and heat treated. The drying step is a step of evaporation or thermal decomposition of the binder or slurry solvent component and the binder component, and it may be included within the heat treatment step. The heat treatment step is a step of dispersing the Al into the steel sheet of the honeycomb body to increase the Al concentration of the steel sheet.

Figure 7:
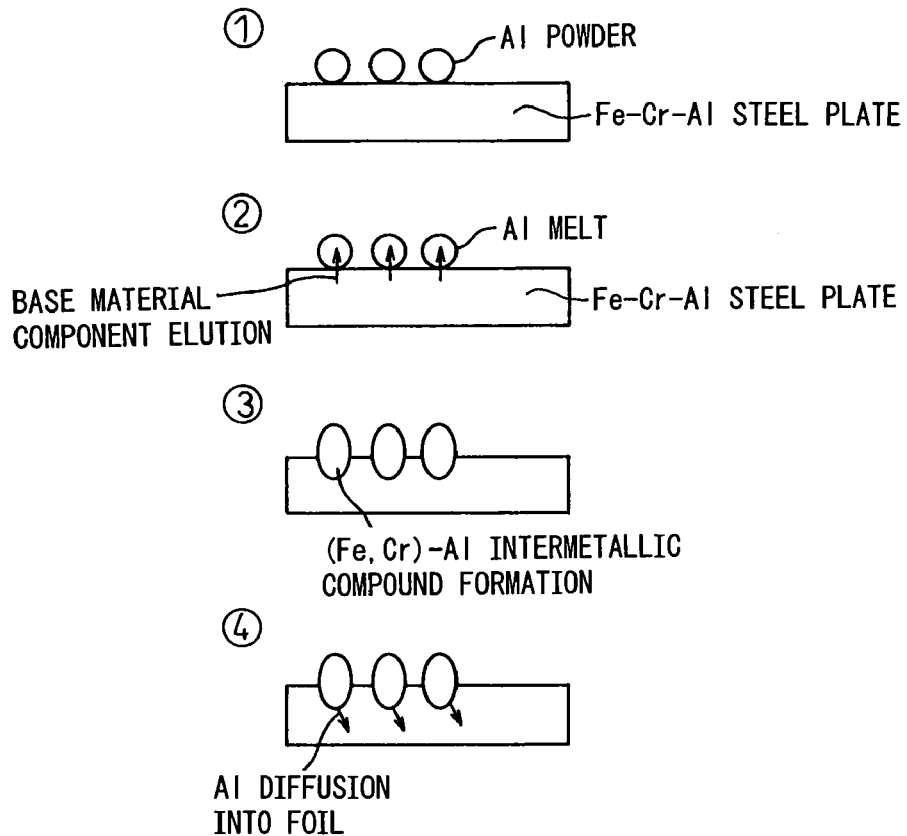
FIG. 7 is a cross-sectional schematic view showing the condition of Al diffused in the base material during the heat treatment step.

During the course of the heat treatment, Al enrichment proceeds in the following manner, as illustrated in FIG. 7. First, the Al adhered to the cell walls melts. Next, the components in the base material elute into the molten Al and increase the Fe and Cr concentration in the molten Al. The amounts of Fe and Cr which can elute into the liquid phase Al are respectively limited, and once they have eluted to their limits, intermetallic compounds are formed at the interface between the liquid phase and the base material, this region gradually spreads, and the intermetallic compounds eventually spread to the areas in which the Al powder was originally present.

The final Al content of the steel sheet composing the honeycomb body after Al enrichment is preferably, on average, greater than 6.5 wt % and no greater than 15 wt %. It is not possible to achieve sufficient oxidation resistance at 6.5 wt % or less in a steel sheet with a thickness of less than 40 μm.

Specifically, the amount of Al powder which must be adhered is determined by the following formula.

$$0.06 \leq \{(\text{weight of honeycomb body}) \times (\text{Al wt \% of base material})/100 + (\text{weight of coated Al})\} / \{(\text{weight of honeycomb body}) + (\text{weight of coated Al})\} \leq 0.15$$

For control of the Al concentration in the base material it is necessary to adequately control the amount of adhering Al. For this purpose, the Al amount is controlled by the air flow from the air blower or by the degree of centrifugal force, as described above, and by managing the viscosity of the Al paint or binder.

Another reason to control the amount of adhering Al is to prevent the unbonded sections from bonding when the Al melts. A metal honeycomb body used as an automobile exhaust gas purification catalyst normally has a construction wherein only the necessary points of contact between the steel sheet are bonded while the other regions are not bonded, in order to inhibit internal deformation when an internal thermal gradient is produced. However, when excess Al is supplied to the regions near the contacts between the steel sheet, the steel sheet strips become bonded together, as disclosed in U.S. Pat. No. 4,602,001. If the average Al content exceeds 15 wt %, more of the points of contact between the steel sheets which are not meant to be bonded will be bonded, and the bonded structure designed to control deformation will not be realized.

Another means for preventing bonding of the sections which are designed to be non-contact regions employs flaky Al powder with a particle size/thickness ratio of 10 or greater. In particular, when an Al paint is used to adhere the Al powder, the paint will tend to pool near the points of contact between the steel sheets, increasing the Al adhesion near the points of contact. Using flaky Al powder allows the Al to evenly adhere to the cell walls and thereby alleviate notable adhesion of Al at the points of contact between the steel sheets, in order to eliminate the drawback of bonding at the sections which are not to be bonded. The average Al content can therefore exceed 15 wt %.

The Al content in the base material before Al enrichment is preferably 2 wt % or greater. At less than 2 wt %, irregularities in the Al powder application will prevent the Al from adequately diffusing into the base material, resulting in a low Al concentration in those regions and potentially leading to partial poor oxidation resistance, but an Al content of 2 wt % or greater in the base material before Al enrichment will result in formation of a strong alumina coating on the surface during the initial use at high temperature, even in those regions. Oxidation after formation of an alumina coating proceeds very slowly. Although Al is certainly consumed as oxidation proceeds in those regions, Al diffuses at a faster rate from the regions of high Al concentration during use so that the Al consumed in those regions is replaced, and therefore oxidation resistance can be maintained even with coating irregularities. Conversely, if the Al content in the base material before Al enrichment exceeds 8 wt % the base material fabrication cost will increase, and therefore the upper limit is 8 wt %.

This process is particularly suited for a honeycomb body composed of an Fe—Cr—Al based alloy steel sheet with a thickness of no greater than 40 µm. For a honeycomb body formed from a steel sheet with a thickness of greater than 40 µm, it is suitable in most cases to simply use a steel sheet with an Al content obtained by the prior art, without any special treatment. However, for use under the particularly severe oxidizing condition immediately under an engine, the Al content obtained by the prior art is inadequate even if a steel sheet with a thickness of greater than 40 µm is used, and in such cases the present invention is highly useful. If the sheet thickness is less than 5 µm, the rigidity of the steel sheet is reduced and mass production of the honeycomb body becomes difficult, and therefore the lower limit for the sheet thickness is preferably 5 µm.

Figure 8A:
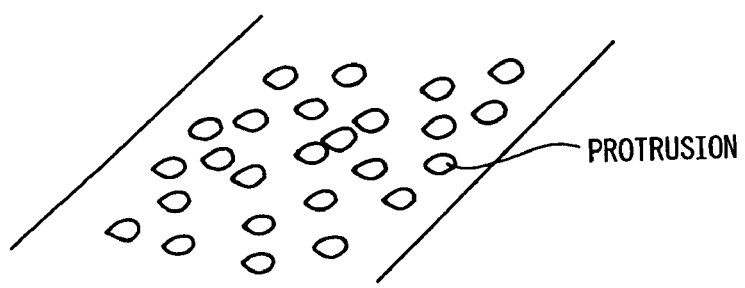
FIG. 8(a) is a perspective view showing protrusions formed in the cell walls of a honeycomb body.
Figure 8B:
FIG. 8(b) is a cross-sectional view showing protrusions formed in the cell walls of a honeycomb body.

The present invention is a process for accumulating Al powder on the surface of a steel sheet composing a honeycomb body and converting it to an Al-alloy, and when the steel sheet of the honeycomb body is Al-enriched by this process, protrusions are formed on the surface which reflect the shape of the Al powder, as shown in FIG. 8(a) and FIG. 8(b). Although a steel sheet formed by rolling is ordinarily flat, the process of the invention forms protrusions on the surface and the protruding sections improve the cohesion of the wash coat (γ-alumina) and increase the surface area of the honeycomb body cell walls, thereby providing the advantage of allowing effective use of the catalyst. Even when flaky Al powder is used, the flakes are converted to spheres by surface tension when the Al powder is melted during the heat treatment step, and therefore similar protrusions are formed. The protrusions are effective for preventing detachment of the γ-alumina when the catalyst is loaded onto the metal honeycomb body.

Incidentally, a honeycomb body comprising a laminated stainless steel sheet is formed by stacking and winding a flat stainless steel sheet with a corrugated sheet obtained by corrugating the flat sheet, or alternately laminating them. All or a portion of the contact sections between the flat sheet and corrugated sheet are bonded by brazing. A honeycomb body formed in this manner is fitted into an jacket made of the same stainless steel, and all or a portion of the contact sections between the honeycomb body and the jacket are also bonded by brazing to obtain a metal carrier. A catalyst supporting layer is formed, wherein the surface of the steel sheet of the honeycomb body cells serving as the gas passageways in the metal carrier is impregnated with the catalyst, to produce a catalyst carrier.

When the catalyst carrier produced in this manner is used as an internal combustion engine exhaust gas purification catalyst carrier, and particularly when used directly under an engine, the temperature of the catalyst carrier increases to about 1100° C. at the exhaust gas inlet end of the catalyst carrier. In order to achieve a long usable life of the honeycomb body in such a high-temperature environment, the Al content of the Fe—Cr—Al based stainless steel sheet forming the honeycomb body is preferably greater than 6.5 wt % and no greater than 15 wt %. The Al content is preferably greater than 6.5 wt % because sufficient oxidation resistance cannot be obtained with a lower content, and it is preferably no greater than 15 wt % because at a higher content the foil becomes brittle and tends to break easily.

At the exhaust gas outlet end of the catalyst carrier, however, the temperature of the catalyst carrier only increases up to about 1000° C. at most. At this temperature level, an Al content of 3 wt % or greater and lower than at the inlet end in the Fe—Cr—Al based stainless steel sheet forming the honeycomb body will ensure adequate oxidation resistance. As a result of lowering the Al content, the thermal expansion coefficient of the stainless steel sheet at the exhaust gas outlet end can be lowered. The Al content is 3 wt % or greater because oxidation resistance must be ensured even at the exhaust gas outlet end, and the content is less than at the inlet end because exceeding it will excessively increase the thermal expansion coefficient and lead to breakage of the honeycomb body.

The temperature distribution in the radial direction of the catalyst carrier for exhaust gas purification is a temperature distribution which is higher at the center and lower at the outer periphery. The flow rate distribution of the exhaust gas tends to be non-uniform in the radial direction, with a higher exhaust gas flow rate at the center and therefore increased catalytic reaction activity and increased temperature at the center. On the other hand, since the exhaust gas flow rate is relatively lower at the periphery, while heat is emitted outward through the jacket, the temperature at the outer periphery is lower than at the center. When the thermal expansion of the catalyst carrier in the axial direction of the catalyst carrier is considered, the thermal expansion in the axial direction is non-uniform in the radial direction due to the temperature distribution in the radial direction, and therefore the degree of thermal expansion at the center is high while the degree of thermal expansion at the outer periphery is low. This non-uniformity of the thermal expansion in the radial direction produces thermal stress in the catalyst carrier. In a catalyst carrier having a high Al content throughout the entire honeycomb body as according to the prior art, the high Al content results in a high thermal expansion coefficient, such that the thermal stress due to temperature non-uniformity is also a large value, and consequently the honeycomb body is prone to breakage due to thermal stress.

According to the invention, the Al content of the stainless steel sheet at the exhaust gas outlet end is a low value as explained above, and therefore the thermal expansion coefficient of the honeycomb body as a whole is low, and the value of the thermal stress can be reduced. As a result, breakage of the honeycomb body due to thermal stress caused by temperature non-uniformity can be prevented.

The distribution of the Al content in the axial direction of the honeycomb body may be such that the Al content changes in a linear fashion from the exhaust gas inlet end to the exhaust gas outlet end, or it may be such that the Al content changes in a curved fashion from the exhaust gas inlet end to the exhaust gas outlet end. Alternatively, the Al content may be high only near the exhaust gas inlet end. The Al content may also change in a stepwise fashion from the exhaust gas inlet end to the exhaust gas outlet end. When the change is in a stepwise fashion, it may be in two, three or more stages. If in two stages, the stepwise change in the Al content may be at a position 1-50% from the exhaust gas inlet end, where 100% is the length in the axial direction of the catalyst carrier.

The Al content of the stainless steel sheet before formation of the honeycomb body is a value lower than the value at the sections with the lowest Al content of the Al content in the honeycomb body to be used as a catalyst carrier. Also, if the Al content of the steel sheet exceeds 6.5%, productivity may be compromised by a greater number of passes required for rolling, and therefore the Al content of the stainless steel sheet prior to formation of the honeycomb body is preferably no greater than 6.5%.

Creation of a different Al content in the stainless steel sheet composing the honeycomb body at the exhaust gas inlet end and exhaust gas outlet end may be accomplished by adhering Al onto the surface of the stainless steel sheet after formation of the honeycomb body and producing a different amount of Al adhesion at the exhaust gas inlet end and exhaust gas outlet end. If the honeycomb body is heat treated after Al adhesion, the adhered Al will melt and diffuse into the stainless steel sheet, thereby increasing the Al content in the stainless steel sheet. Also, a difference in Al content in the stainless steel sheet may be produced based on the difference in amounts of Al adhesion at different locations.

The Al may be adhered to the surface of the stainless steel sheet by a method of applying Al paint onto the steel sheet surface. A paint comprising Al powder, a resin and a solvent is prepared. The Al powder used may have a mean particle size of about 0.1-50 μm. Using flakes as the Al powder can provide a more desirable effect. The resin is necessary for anchorage onto the cell wall surfaces after the solvent has evaporated by drying. The resin used may be a common one such as an ethyl cellulose or phenol resin. The solvent used may be industrial kerosene or xylene. The amount of solvent used is important for management of the viscosity of the paint. A satisfactory result is achieved if the viscosity of the paint is kept between 10-5000 mPa·s. The paint is applied onto the steel sheet surface. The application method may be a method involving immersion of the honeycomb body in the paint solution. The paint-coated honeycomb body is then subjected to centrifugation or air blowing to remove the excess paint. The removal is carried out so that the paint flows from the exhaust gas outlet end toward the exhaust gas inlet end. As a result, the paint adhesion thickness at the exhaust gas outlet end is reduced, while the paint adhesion thickness at the exhaust gas inlet end is increased. The paint is dried, and then the honeycomb body is heat treated. The heat treatment atmosphere may be air or an inert atmosphere, but it is preferably an inert atmosphere. In order to melt the Al powder, the heat treatment temperature must be 600° C. or higher. When the resin is included in the paint, the heat treatment will result in thermal decomposition and removal of the resin. The Al adhering to the surface during heat treatment diffuses into the stainless steel sheet, thereby increasing the Al content of the stainless steel sheet in correspondence to the amount of Al adhesion. The heat treatment may be conducted at the same time as the heat treatment for brazing of the honeycomb body steel sheet contact sections.

For stepwise change in the Al concentration in the axial direction of the honeycomb body, two different Al paints with different Al concentrations are prepared, and the exhaust gas inlet end part of the honeycomb body is immersed in the high Al-concentration Al paint while the exhaust gas outlet end part of the honeycomb body is immersed in the low Al-concentration Al paint. Alternatively, the exhaust gas inlet section alone may be immersed in the paint.

The method employed to adhere the Al to the stainless steel sheet surface may instead be vapor deposition. This method involves dissolution and vaporization with an electron gun for adhesion of Al onto the stainless steel sheet set above the vaporization source. Utilizing the fact that the Al vaporization rate is fastest directly above the electron gun while the vaporization rate is slower further from the area directly above the electron gun in the horizontal direction, it is possible to form the coating thicker directly above and thinner around the peripheral areas. Specifically, a steel sheet having a width approximately equal to the length of the honeycomb body may be placed with the section corresponding to the exhaust gas inlet end situated directly above the vaporization source, and the section corresponding to the outlet end situated away from the vaporization source, in order to fabricate a steel sheet having a different Al content in the widthwise direction.

If the steel sheet fabricated by this process is corrugated and wound together with a flat sheet and the honeycomb body subjected to brazing treatment, it will be possible to produce a honeycomb body having a higher Al content at the exhaust gas inlet end than at the outlet end.

An additional effect of the present invention is that, since the Al-enriched sections are mainly at the exhaust gas inlet end, the manufacturing cost can be advantageously reduced compared to processes wherein the entire honeycomb body is Al-enriched.

EXAMPLES

The present invention will now be explained in greater detail by examples.

Example 1

A 30 μm thick steel sheet composed of Fe—Cr—Al based stainless steel having the composition shown in Table 1 was prepared and used to form a honeycomb body.

A 50 kg ingot was melted and subjected to hot rolling, cold rolling and foil rolling to obtain a 30 μm thick steel sheet. For a steel sheet with an Al content of 8.0 wt % or less, the components of the ingot were matched to the components of the desired steel sheet, and rolling was carried out to complete the steel sheet. For a steel sheet with an Al content of greater than 8.0%, an Al content of 8.0% was used for the ingot, the contents of the components other than Al were matched to the target contents of those components in the steel sheet, and the ingot was rolled to a sheet thickness of 30 μm, after which Al was adhered to the surface of the steel sheet by vacuum vapor deposition followed by diffusion annealing, and finally rolling was carried out slightly to prepare a 30 μm thick steel sheet. The amount of adhesion of the vapor deposited Al was selected so that the Al content of the steel sheet after diffusion annealing was according to the composition shown in Table 1.

Flat and corrugated forms of the steel sheet prepared above were stacked and wound to prepare a honeycomb body with a honeycomb body length of 80 mm and a honeycomb diameter of 60 mm. The cell density was 400 cpsi (wave pitch: 2.5 mm, wave height: 1.25 mm). The honeycomb body was fitted into a jacket and subjected to brazing. At the exhaust gas inlet end edge, the contact sections between the flat and corrugated sheets were brazed to a depth of 20 mm. At the exhaust gas outlet end edge, the contact sections between the honeycomb body core and jacket were brazed to a depth of 25 mm. The outer periphery of the honeycomb body had a peripheral reinforcing layer formed by brazing the contact sections between the flat and corrugated sheets to a 3-layer portion from the periphery, to form a "portal" structure.

The hot rolling workability of the steel sheet was judged based on the hot rolling success rate during the hot rolling. The success rate was judged by hot rolling a 50 kg ingot 20 times, with hot rolling success defined as successful rolling to a 3 mm thickness without cracks during the hot rolling. A hot rolling success rate of 80% was designated as satisfactory.

For the brazing property of the honeycomb body, the brazed metal carrier was mounted in an engine and an engine heating cycle test was carried out with 1000 cycles, where each cycle consisted of 10 minutes of engine running with the exhaust gas temperature at the metal carrier inlet end at 1000° C., followed by 10 minutes of engine rest, upon which the degree of displacement of the core toward the exhaust gas outlet end was noted.

The results are shown in Table 1.

Sheet Nos. 1-13 of the invention and comparison sheet No. 14 all exhibited satisfactory hot rolling success rates. Comparison sheet No. 15 exceeded the upper limit for the Cu content, and exhibited a hot rolling success rate of 0%. Comparison sheet No. 16 exceeded the upper limit for the total of the Zn, Sn, Sb, Bi and Pb contents, and exhibited a hot rolling success rate of 0%.

As regards improvement in wettability during brazing, Sheet Nos. 1-7 of the invention which contained Cu, sheet Nos. 8-10, 12 and 13 which contained Cu and Mg and sheet No. 11 which contained Mg all exhibited satisfactory brazing properties. Comparison sheet No. 14 which contained no Mg and had a Cu content below the lower limit had an unsatisfactory brazing property. Comparison sheet Nos. 15 and 16 which had 0% hot rolling success rates could not be evaluated in the brazing test.

Example 2

Stainless steel comprising, by weight, C, 0.007%, Si: 0.3%, Mn: 0.3%, P: 0.03%, S: 0.001%, Al: 5%, Ti: 0.03%, Cr: 20%, Nb: 0.03%, La: 0.05%, Ce: 0.05%, N: 0.007% was subjected to hot rolling and cold rolling to obtain a 30 μm thick stainless steel sheet.

For Example 2-1, a paint comprising Al powder was applied onto the stainless steel sheet to various thicknesses, and heat treatment was carried out for 4 hours at a temperature of 1000° C. The viscosity of the Al powder-comprising paint was adjusted to 100 cp by addition of xylene, based on a 50 wt % content of Al powder with a mean particle size of 10 μm and a 50 wt % content of ethyl cellulose. As a result, protrusions formed on the surface of the stainless steel sheet. The density of protrusions with a height of 1 μm or greater was 10, 50, 100 and 200/cm$^2$ for sheet Nos. 1, 2, 3 and 4, respectively.

The amount of Al in each stainless steel sheet having protrusions formed on the surface was at least 7%.

For Example 2-2, Al was vapor deposited on the stainless steel sheet to form an Al coating with a thickness of 0.5-4 μm, prior to heat treatment for 2 hours at a temperature of 1000° C. As a result, the surface roughness Ra of the stainless steel sheet was 1, 2, 3 and 4 μm for sheet Nos. 5, 6, 7 and 8, respectively.

The amount of Al in each stainless steel sheet having a surface roughness Ra of 2 μm or greater was at least 7%.

For Example 2-3 (sheet No. 9), no treatment was carried out for formation of an Al coating. The surface roughness Ra of the stainless steel sheet was 0.8 μm, and no protrusions were formed.

Each of the prepared stainless steel sheets was directly used as a flat sheet or as a corrugated sheet obtained by corrugating the stainless steel sheet, and the flat and corrugated sheets were alternately wound in a spiral fashion to produce a metal honeycomb body, which was then inserted into an identical

TABLE 1

| | No. | C | N | Cr | Al | Si | Mn | P | S | Ti | Nb | La | Ce | Cu | Mg | Zn + Sn + Sb + Bi + Pb | Hot rolling success rate (%) | Brazing property |
|---|---|---|---|---|---|---|---|---|---|---|---|---|---|---|---|---|---|---|
| Present invention sheet No. | 1 | 0.0045 | 0.0065 | 21.0 | 7.31 | 0.24 | 0.42 | 0.034 | 0.0009 | 0.021 | 0.001 | 0.015 | 0.045 | 0.012 | <0.001 | 0.022 | 100 | 4 mm |
| | 2 | 0.0031 | 0.0074 | 21.4 | 7.21 | 0.45 | 0.41 | 0.046 | 0.0008 | 0.023 | 0.034 | 0.030 | 0.048 | 0.032 | <0.001 | 0.032 | 100 | 3 mm |
| | 3 | 0.0024 | 0.0054 | 19.5 | 6.58 | 0.29 | 0.20 | 0.046 | 0.0012 | 0.034 | 0.005 | 0.040 | 0.046 | 0.053 | <0.001 | 0.015 | 100 | 1 mm |
| | 4 | 0.0072 | 0.0073 | 22.5 | 7.75 | 0.35 | 0.31 | 0.038 | 0.0004 | 0.085 | 0.046 | 0.053 | 0.038 | 0.102 | <0.001 | 0.007 | 100 | 1 mm |
| | 5 | 0.0068 | 0.0065 | 26.2 | 8.54 | 0.37 | 0.25 | 0.037 | 0.0013 | 0.067 | 0.032 | 0.027 | 0.050 | 0.334 | <0.001 | 0.025 | 95 | 1 mm |
| | 6 | 0.0057 | 0.0076 | 17.9 | 7.54 | 0.54 | 0.25 | 0.036 | 0.0007 | 0.059 | 0.057 | 0.047 | 0.024 | 0.572 | <0.001 | 0.030 | 90 | 1 mm |
| | 7 | 0.0054 | 0.0082 | 22.5 | 6.57 | 0.47 | 0.21 | 0.037 | 0.0009 | 0.045 | 0.034 | 0.021 | 0.050 | 0.785 | <0.001 | 0.042 | 80 | 1 mm |
| | 8 | 0.0072 | 0.0126 | 23.4 | 8.14 | 0.38 | 0.34 | 0.024 | 0.0008 | 0.034 | 0.085 | 0.034 | 0.064 | 0.007 | 0.002 | 0.025 | 100 | 1 mm |
| | 9 | 0.0165 | 0.0034 | 23.4 | 9.17 | 0.95 | 0.25 | 0.026 | 0.0008 | 0.034 | 0.092 | 0.030 | 0.081 | 0.005 | 0.009 | 0.030 | 100 | 0 mm |
| | 10 | 0.0064 | 0.0075 | 21.4 | 7.69 | 0.79 | 0.25 | 0.038 | 0.0004 | 0.034 | 0.064 | 0.072 | 0.012 | 0.002 | 0.013 | 0.045 | 95 | 1 mm |
| | 11 | 0.0055 | 0.0047 | 20.8 | 10.24 | 0.74 | 0.34 | 0.016 | 0.0001 | 0.015 | 0.048 | 0.046 | 0.025 | <0.001 | 0.084 | 0.019 | 100 | 1 mm |
| | 12 | 0.0091 | 0.0046 | 21.7 | 9.68 | 0.61 | 0.45 | 0.024 | 0.0007 | 0.034 | 0.001 | 0.020 | 0.035 | 0.095 | 0.005 | 0.047 | 95 | 0 mm |
| | 13 | 0.0087 | 0.0084 | 23.5 | 8.54 | 0.36 | 0.25 | 0.038 | 0.0006 | 0.001 | 0.010 | 0.017 | 0.033 | 0.125 | 0.013 | 0.023 | 100 | 0 mm |
| Comparison sheet No. | 14 | 0.0089 | 0.0072 | 18.6 | 12.67 | 0.85 | 0.21 | 0.038 | 0.0006 | 0.034 | 0.001 | 0.046 | 0.050 | 0.007 | <0.001 | 0.031 | 100 | 7 mm |
| | 15 | 0.0032 | 0.0064 | 20.5 | 8.45 | 0.82 | 0.12 | 0.024 | 0.0006 | 0.054 | 0.024 | 0.024 | 0.034 | 1.270 | <0.001 | 0.048 | 0 | — |
| | 16 | 0.0045 | 0.0052 | 19.7 | 10.64 | 0.84 | 0.39 | 0.016 | 0.0006 | 0.034 | 0.047 | 0.076 | 0.050 | 0.187 | 0.005 | 0.055 | 0 | — | stainless steel jacket 4 to prepare a metal carrier. The diameter of the metal carrier was 100 mm, the length was 110 mm, the corrugated sheet wave height was 1.25 mm and the corrugation pitch was 2 mm.

The metal carrier was immersed in a wash coat solution and then dried to form a wash coat layer with an average thickness of 25 μm in the cells. A catalyst comprising a rare metal was impregnated into the wash coat layer to complete the metal catalyst carrier.

The cohesion of the wash coat layer was examined by an engine heat cycle test. Each heat cycle consisted of 10 minutes of engine running with the temperature at the catalyst carrier exhaust gas inlet end at 1000° C., followed by 10 minutes of engine rest, and evaluation was based on the presence of any peeling of the wash coat.

For the exhaust gas performance, a metal catalyst 20 carrier fabricated in the manner described above was set in an automobile exhaust gas system and the HC emission was evaluated in mode 11.

The results are shown in Table 2.

TABLE 2

| | No. | Protrusion density (/cm$^2$) | Surface roughness Ra (μm) | Wash coat layer cohesion | HC emission (g/km) | |
|---|---|---|---|---|---|---|
| Example 2-1 | 1 | 10 | — | x | 1.56 | comparison sheet |
| Al powder applied | 2 | 50 | — | x | 1.53 | comparison sheet |
| | 3 | 100 | — | ○ | 1.47 | present invention |
| | 4 | 200 | — | ○ | 1.43 | present invention |
| Example 2-2 | 5 | — | 1 | x | 1.56 | comparison sheet |
| Al vacuum vapor deposited | 6 | — | 2 | ○ | 1.48 | present invention |
| | 7 | — | 3 | ○ | 1.46 | present invention |
| | 8 | — | 4 | ○ | 1.46 | present invention |
| Example 2-3 | 9 | — | 0.8 | x | 1.55 | comparison sheet |

As shown in Table 2, the catalyst carriers using the steel sheets with protrusion density according to the present invention had satisfactory wash coat cohesion and acceptable HC emission.

As also shown in Table 2, the catalyst carriers using the steel sheets with surface roughness Ra of 2 μm or greater had satisfactory wash coat cohesion and acceptable HC emission.

Example 3

As stainless steel sheets there were prepared a steel sheet having gaps according to the invention and a comparison steel sheet with the same components and same sheet thickness but containing no gaps as a comparison, and then the two steel sheets were simultaneously placed in engine-simulated exhaust gas and the temperature elevation rates of the surface temperatures of both were compared.

Example 3-1

A comparison test was carried out with a 30 μm thick stainless steel sheet comprising, by weight, C, 0.007%, Si: 0.3%, Mn: 0.3%, P: 0.03%, S: 0.001%, Al: 7.5%, Ti: 0.03%, Cr: 20%, Nb: 0.03%, La: 0.05%, Ce: 0.05%, N: 0.007%.

Steel sheet No. 1 according to the invention had an Al content of 5% and a content of components other than Al as listed above, having a 27.6 μm thick stainless steel sheet as the base material with an Al alloy comprising Al-10% Si plated onto both surfaces of the base material to a thickness of 1.2 μm on each side, prior to heat treatment in a vacuum at 1200° C.×2 hours. The sheet thickness after heat treatment was 30 μm, the Al content of the steel sheet was 7.5%, and numerous 0.2-0.5 μm gaps were confirmed near a region 1.2 μm from the surface of the steel sheet, at an average spacing of 6 μm.

Comparison steel sheet No. 2 was produced by the same method as sheet No. 1 of the invention, i.e., using a stainless steel sheet with an Al content of 5% and a content of components other than Al as listed above as the base material, plating both sides with Al and then subjecting it to heat treatment, to obtain a steel sheet with a thickness of 50 μm and an Al content of 7.5%. The surface was polished, including the gaps present near the surface of the steel sheet, to make a thickness of 30 μm.

The two steel sheets were simultaneously placed in engine-simulated exhaust gas and the temperature elevation rates of the surface temperatures of both were compared, yielding the results shown in Table 3. As clearly shown by these results, the temperature elevation rate for the temperature of the steel sheet of the invention was greater than for the comparison steel sheet. The temperature difference was particularly notable up to about the first 10 seconds, corresponding to build-up immediately after starting of the engine.

TABLE 3

| | | | Elapsed time (sec) | | | | | |
|---|---|---|---|---|---|---|---|---|
| | No. | | 5 | 10 | 15 | 20 | 25 | 30 |
| Present invention | 1 | Foil surface temperature (K) | 454 | 612 | 635 | 663 | 667 | 675 |
| Comparison sheet | 2 | Foil surface temperature (K) | 413 | 565 | 603 | 643 | 652 | 662 |

Example 3-2

A comparison test was carried out with a 42 μm thick stainless steel sheet comprising, by weight, C, 0.007%, Si: 0.3%, Mn: 0.3%, P: 0.03%, S: 0.001%, Al: 12.4%, Ti: 0.03%, Cr: 20%, Nb: 0.03%, La: 0.05%, Ce: 0.05%, N: 0.007%.

Steel sheet No. 3 according to the invention had an Al content of 8.1% and a content of components other than Al as listed above, having a 36.2 μm thick stainless steel sheet as the base material with an Al alloy comprising Al-10% Si plated onto both surfaces of the base material to a thickness of 2.9 μm on each side, prior to heat treatment in a vacuum at 1200° C.×2 hours. The sheet thickness after heat treatment was 42 μm, the Al content of the steel sheet was 12.4%, and numerous 0.2-0.7 μm gaps were confirmed near a region 2.9 μm (0.7t/10) from the surface of the steel sheet, at an average spacing of 8 μm.

Steel sheet No. 4 according to the invention had an Al content of 0.45% and a content of components other than Al as listed above, having a 32.4 μm thick stainless steel sheet as the base material with an Al alloy comprising Al-10% Si plated onto both surfaces of the base material to a thickness of 4.2 μm on each side, prior to heat treatment in a vacuum at 1200° C.×2 hours. The sheet thickness after heat treatment was 42 μm, the Al content of the steel sheet was 12.4%, and numerous 0.3-0.7 μm gaps were confirmed near a region 4.8 μm (0.8t/7) from the surface of the steel sheet, at an average spacing of 8 μm.

The base material for sheet No. 3 of the invention was produced by the same method as sheet No. 1 of the invention, i.e., using a stainless steel sheet with an Al content of 5% and a content of components other than Al as listed above as the base material, plating both sides with Al and then subjecting it to heat treatment, to obtain a steel sheet with a thickness of 50 μm and an Al content of 8.1%. The surface was then polished, including the gaps present near the surface of the steel sheet, to make a thickness of 30 μm.

Comparison steel sheet No. 5 contained no Al and a had content of components other than Al as listed above, with a 30 μm thick stainless steel sheet as the base material and an Al alloy comprising Al-10% Si plated onto both surfaces of the base material to a thickness of 7 μm on each side, prior to heat treatment in a vacuum at 1200° C.×2 hours. The sheet thickness after heat treatment was 42 μm, the Al content of the steel sheet was 12.4%, and numerous 0.2-0.6 μm gaps were confirmed near a region 7.2 μm (1.2t/7) from the surface of the steel sheet, at an average spacing of 8 μm.

The three steel sheets were simultaneously placed in engine-simulated exhaust gas and the temperature elevation rates of the surface temperatures were compared, yielding the results shown in Table 4. As clearly seen in Table 4, the temperature elevation rate for steel sheets No. 3 and No. 4 which had gaps within t/7 (6 μm) from the surface was greater than for the 30 μm thick steel sheet No. 2 of Example 3-1, despite a larger sheet thickness of 42 μm. In contrast, the gaps in the comparison steel sheet No. 5 did not significantly contribute to surface temperature elevation of the steel sheet.

TABLE 4

| | | Gap | | Elapsed time (sec) | | | | | |
|---|---|---|---|---|---|---|---|---|---|
| | No. | position | | 5 | 10 | 15 | 20 | 25 | 30 |
| Present invention | 3 | 0.7t/10 (2.9 μm) | Foil surface temperature (K) | 430 | 610 | 622 | 645 | 651 | 655 |
| Present invention | 4 | 0.8t/7 (4.8 μm) | Foil surface temperature (K) | 420 | 595 | 610 | 630 | 635 | 640 |
| Comparison sheet | 5 | 1.2t/7 (7.2 μm) | Foil surface temperature (K) | 392 | 540 | 575 | 611 | 620 | 630 |

Example 3-3

A comparison test was carried out with a 62.2 μm thick stainless steel sheet comprising, by weight, C: 0.007%, Si: 0.3%, Mn: 0.3%, P: 0.03%, S: 0.001%, Al: 7.0%, Ti: 0.03%, Cr: 20%, Nb: 0.03%, La: 0.05%, Ce: 0.05%, N, 0.007%.

Steel sheet Nos. 7-12 according to the invention and comparison sheet Nos. 6 and 13 had an Al content of 7.0% and a content of components other than Al as listed above, having a 50 μm thick stainless steel sheet as the base material with an Al alloy comprising Al-10% Si plated onto both surfaces of the base material to a thickness of 6.1 μm on each side, prior to heat treatment in a vacuum at 1000-1200° C.×1-10 hours. The sheet thickness after heat treatment was 62.2 μm, and the Al content of the steel sheet was 7.0%.

Numerous gaps were formed near a region about 6 μm from the surface of the steel sheet. The sizes of the gaps were as shown in Table 5, each differing due to the heat treatment conditions, allowing creation of sizes from 0.05 μm for comparison sheet No. 6 and 0.19 μm for sheet No. 7 of the invention, to 4.7 μm for sheet No. 12 of the invention and 5.8 μm for comparison sheet No. 13. The average spacing between the gaps was in the range of about 10 L to 14 L for each of the samples, where L is the gap size.

The eight steel sheets were simultaneously placed in engine-simulated exhaust gas and the surface temperature elevation rates were compared, yielding the results shown in Table 5. The steel sheet surface temperature elevation was low for steel sheet No. 6 which had smaller gaps than the range of the invention. The elevation rates were relatively high for steel sheet Nos. 7 to 12 which were in the range of the invention. The elevation rate was high for the comparison steel sheet No. 13, but cracks were introduced in the surface near the gaps during a tensile test, and therefore the strength was reduced.

TABLE 5

| | No. | Gap size | | Elapsed time (sec) | | | | | |
|---|---|---|---|---|---|---|---|---|---|
| | | | | 5 | 10 | 15 | 20 | 25 | 30 |
| Comparison sheet | 6 | 0.05 | Foil surface temperature (K) | 370 | 510 | 551 | 592 | 603 | 611 |
| Present invention | 7 | 0.19 | Foil surface temperature (K) | 415 | 570 | 605 | 645 | 655 | 665 |
| Present invention | 8 | 0.3 | Foil surface temperature (K) | 420 | 573 | 609 | 650 | 660 | 667 |
| Present invention | 9 | 1.2 | Foil surface temperature (K) | 430 | 580 | 615 | 655 | 662 | 669 |
| Present invention | 10 | 2.3 | Foil surface temperature (K) | 437 | 584 | 620 | 661 | 662 | 670 |
| Present invention | 11 | 3.5 | Foil surface temperature (K) | 440 | 590 | 627 | 663 | 665 | 671 |
| Present invention | 12 | 4.7 | Foil surface temperature (K) | 450 | 597 | 635 | 665 | 669 | 673 |
| Comparison sheet | 13 | 5.8 | Foil surface temperature (K) | 452 | 615 | 643 | 667 | 671 | 675 |

Example 4

For each of the following examples there were prepared a steel sheet flat sheet and a corrugated sheet obtained by corrugating the stainless steel sheet, and the flat and corrugated sheets were alternately wound in a spiral fashion to produce a metal honeycomb body, which was then inserted into an identical stainless steel jacket to prepare a metal carrier. The diameter of the metal carrier was 100 mm, the length was 110 mm, the corrugated sheet wave height was 1.25 mm and the corrugation pitch was 2 mm. The formed honeycomb body was coated with a brazing material and the honeycomb body was subjected to high temperature heat treatment for brazing of the contact sections between the flat and corrugated sheets of the metal honeycomb body.

The metal carrier was immersed in a wash coat solution and then dried to form a wash coat layer in the cells. A catalyst comprising a rare metal was impregnated into the wash coat layer to complete the metal catalyst carrier.

The metal catalyst carrier was subjected to a cold-heat durability test. A catalyst carrier sample was mounted directly under the exhaust manifold of a 3000 cc gasoline engine, and an engine test was conducted by an engine bench test with 1200 repeated cold/hot cycles each comprising 5 minutes full-throttle at 5000 rpm and 10 minutes of engine rest/cooling, inspecting the catalyst carrier every 50-100 cycles, and evaluating the degree of displacement of the honeycomb body and any abnormal oxidation.

Example 4-1

The steel sheet thickness was 20 μm, and the components of the steel sheet of the honeycomb body, the thermal expansion coefficient α, the proof strength σ and the value of the right side of inequality <1> were as shown in Table 1.

First, different Fe—Cr—Al based alloys with Al contents of no greater than 5% were melted and subjected to hot and cold rolling to produce 0.4 mm thick cold rolled steel sheets as base materials. The steel sheets were then passed through a 90 wt % Al-10 wt % Si plating bath melted to a temperature of 660° C., for adhesion of the Al—Si alloy onto the surface. The wiping flow rate was varied to adjust the plating thickness, and the plating thickness formed was based on the difference between the Al content of the base material and the target Al content after heat diffusion. The diffusion of Al into the steel was accomplished by heat treatment in a vacuum, and this was followed by cold rolling to obtain a 20 μm thick steel sheet. A high temperature tensile test piece (#13-B) and a thermal expansion coefficient measurement test piece were cut out from part of the obtained steel sheet, and used to determine the 0.2% proof strength at 900° C. and the thermal expansion coefficient with temperature increase from 20° C. to 1000° C. The strain rate in the tensile test was constant at 0.3%/min, and the temperature elevation rate during measurement of the thermal expansion coefficient was constant at 10° C./min.

Steel sheet Nos. 1-6 of the invention and comparison steel sheet Nos. 7 and 9 were produced by the hot dipp plating method described above, while comparison steel sheet No. 8 was produced by melting and hot/cold rolling of the Fe—Cr—Al based alloy.

A corrugated sheet obtained by corrugating the aforementioned steel sheet was combined with the flat sheet and partially bonded by brazing to manufacture a honeycomb body. The bonding strength per centimeter of the brazed sections was 100 N or greater in all cases, and satisfactory brazing was confirmed.

The results of the cold-heat durability test are shown in Table 6.

TABLE 6

| | No. | Steel sheet components (wt %) | | | | | | Thermal expansion coefficient (μm/m/° C.) | Proof strength (N/mm$^2$) | Right side of inequality <1> (N/mm$^2$) | Cold-heat durability test result |
|---|---|---|---|---|---|---|---|---|---|---|---|
| | | Cr | Al | Ti | Nb | La | Ce | | | | |
| Present invention | 1 | 20 | 6.0 | 0.06 | — | 0.04 | 0.04 | 16.5 | 38.8 | 24.1 | OK |
| | 2 | 19 | 7.0 | 0.06 | — | 0.04 | 0.04 | 17.2 | 42.1 | 28.4 | OK |

TABLE 6-continued

|  | No. | Steel sheet components (wt %) | | | | | | Thermal expansion coefficient (μm/m/° C.) | Proof strength (N/mm²) | Right side of inequality <1> (N/mm²) | Cold-heat durability test result |
|---|---|---|---|---|---|---|---|---|---|---|---|
|  |  | Cr | Al | Ti | Nb | La | Ce |  |  |  |  |
|  | 3 | 19 | 8.4 | 0.06 | — | 0.04 | 0.04 | 18.3 | 50.2 | 34.3 | OK |
|  | 4 | 18 | 10.3 | 0.06 | — | 0.04 | 0.04 | 20.0 | 56.1 | 41.2 | OK |
|  | 5 | 18 | 7.0 | — | 0.05 | 0.04 | 0.04 | 17.3 | 65.3 | 29.0 | OK |
|  | 6 | 15 | 7.1 | — | 0.05 | 0.04 | 0.04 | 17.3 | 59.8 | 29.0 | OK |
| Comparison sheet | 7 | 12 | 6.5 | 0.06 | — | 0.04 | 0.04 | 16.9 | 24.8 | 26.6 | displacement at 1100 cycles |
|  | 8 | 10 | 2.0 | 0.06 | — | 0.04 | 0.04 | 14.3 | 15.3 | 7.7 | abnormal oxidation at 50 cycles |
|  | 9 | 17 | 12.6 | 0.06 | — | 0.04 | 0.04 | 24.3 | 62.4 | 47.2 | displacement at 1000 cycles |

For sheet Nos. 1-6 according to the invention, the thermal expansion coefficients α and the proof strength σ were all within the ranges of the invention, and the cold-heat durability test results were satisfactory.

The proof strength of comparison sheet No. 7 failed to satisfy inequality <1>, and displacement of the honeycomb body occurred at 1100 cycles of the cold-heat durability test. The proof strength failed to satisfy inequality <1> because of the low Cr content of 12% among the steel sheet components.

The thermal expansion coefficient of comparison sheet No. 8 was less than the lower limit, and abnormal oxidation occurred at 50 cycles of the cold-heat durability test. The reason for the low thermal expansion coefficient and the abnormal oxidation was that the Al content of the steel sheet was a low 2%.

The thermal expansion coefficient of comparison sheet No. 9 exceeded the upper limit of the range of the invention, and the high thermal stress causes displacement of the honeycomb body at 1000 cycles. The reason for the high thermal expansion coefficient was that the Al content was a high 12.6%.

Example 4-2

The thickness of the steel sheet was 30 μm, and the components of the steel sheet of the honeycomb body, the thermal expansion coefficient α, the proof strength σ and the value of the right side of inequality <1> were as shown in Table 7.

Steel sheets with a thickness of 30 μm were produced by the same process as in Example 4-1, and the steel sheets were used to fabricate honeycomb bodies. The bonding strength per centimeter of the brazed sections of the honeycomb bodies was 150 N or greater in all cases, and satisfactory brazing was confirmed.

The results of the cold-heat durability test are shown in Table 7.

TABLE 7

|  | No. | Steel sheet components (wt %) | | | | | | Thermal expansion coefficient (μm/m/° C.) | Proof strength (N/mm²) | Right side of inequality <1> (N/mm²) | Cold-heat durability test result |
|---|---|---|---|---|---|---|---|---|---|---|---|
|  |  | Cr | Al | Ti | Nb | La | Ce |  |  |  |  |
| Present invention | 10 | 20 | 6.1 | 0.06 | — | 0.04 | 0.04 | 16.6 | 38.3 | 16.5 | OK |
|  | 11 | 19 | 7.1 | 0.06 | — | 0.04 | 0.04 | 17.3 | 42.5 | 19.3 | OK |
|  | 12 | 19 | 8.5 | 0.06 | — | 0.04 | 0.04 | 18.4 | 51.3 | 23.2 | OK |
|  | 13 | 18 | 10.0 | 0.06 | — | 0.04 | 0.04 | 19.8 | 57.2 | 27.0 | OK |
| Comparison sheet | 14 | 12 | 2.3 | 0.06 | — | 0.04 | 0.04 | 14.5 | 23.5 | 6.3 | abnormal oxidation at 300 cycles |
|  | 15 | 17 | 13.0 | 0.06 | — | 0.04 | 0.04 | 25.0 | 65.4 | 30.8 | displacement at 400 cycles |

For sheet Nos. 10-13 according to the invention, the thermal expansion coefficients α and the proof strength σ were all within the ranges of the invention, and the cold-heat durability test results were satisfactory.

The thermal expansion coefficient of comparison sheet No. 14 was less than the lower limit of the range of the invention, and abnormal oxidation occurred at 300 cycles of the cold-heat durability test. The reason for the low thermal expansion coefficient and the abnormal oxidation was that the Al content of the steel sheet was a low 2.3%.

The thermal expansion coefficient of comparison sheet No. 15 exceeded the upper limit of the range of the invention, and the high thermal stress caused displacement of the honeycomb body at 4000 cycles. The reason for the high thermal expansion coefficient was that the Al content was a high 13.0%.

INDUSTRIAL APPLICABILITY

The present invention provides an Fe—Cr—Al based stainless steel sheet and double layered sheet having an Al content of greater than 6.5%, and a honeycomb body employing the stainless steel sheet or double layered sheet, wherein inclusion of Cu and/or Mg results in satisfactory wettability of the brazing material. In addition, appropriate control of the content of Cu or impurity elements can produce satisfactory hot rolled sheet ductility. There is further provided a process for fabrication of a high Al-containing stainless steel sheet suitable for hot rolling, whereby a steel sheet with a low Al content is rolled, an Al layer is adhered to the surface and the Al diffuses into the stainless steel sheet by diffusion annealing.

Furthermore, by forming protrusions with a height of 1 μm or greater on the surface of the steel sheet composing the honeycomb body, it is possible to improve the cohesion of the wash coat layer, and accelerate the catalyst reaction by a turbulence effect.

Moreover, by producing a surface roughness Ra of 2 μm or greater in the steel sheet composing the honeycomb body, it is possible to improve the cohesion of the wash coat layer, and accelerate the catalyst reaction by a turbulence effect.

The Al-containing stainless steel sheet of the invention may also have isolated gaps formed in the interior of the steel sheet to reduce the thermal conductivity. Consequently, when a catalyst carrier is constructed with a honeycomb body employing a steel sheet according to the invention, it is possible to increase the temperature of the catalyst before the heat of the exhaust gas raises the temperature near the center of the steel sheet thickness, thereby increasing the temperature elevation rate of the catalyst itself and yielding a catalyst carrier with excellent purification performance.

The present invention also specifies the proof strength condition required for a steel sheet by the relationship between the thickness and thermal expansion coefficient of the steel sheet, while also specifying the preferred range for the thermal expansion coefficient, and therefore permitting fabrication of a steel sheet and honeycomb body having excellent high-temperature durability to allow its use under severe conditions at temperatures exceeding 1000° C.

What is claimed is:

1. A high Al-containing Fe—Cr—Al based stainless steel sheet characterized by comprising, by weight, Cr: 10-30% and Al: >6.5%-15%, Si: 0.1-1.0% Mn≦0.5%, La: 0.01-0.1%, Ce: 0.01-0.1%, P: 0.01-0.05%, Cu: 0.03-0.5%, Mg: 0.005-0.1%, and either or both Ti: 0.02-0.1% and Nb: 0.02-0.3%, with the remainder being Fe and unavoidable impurities.

2. A high Al-containing Fe—Cr—Al based stainless steel sheet according to claim 1, characterized in that the total of Zn, Sn, Sb, Bi and Pb in said steel sheet is limited to no greater than 0.05% by weight.

3. A high Al-containing Fe—Cr—Al based stainless steel sheet according to claim 1, characterized in that the thickness of said steel sheet is 10-40 μm.

4. An exhaust gas purification catalyst-carrying honeycomb body, wherein said body comprises a high Al-containing Fe—Cr—Al based stainless steel sheet according to claim 1.

* * * * *

UNITED STATES PATENT AND TRADEMARK OFFICE
CERTIFICATE OF CORRECTION

PATENT NO. : 7,601,672 B2
APPLICATION NO. : 10/535602
DATED : October 13, 2009
INVENTOR(S) : Inaguma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 235 days.

Signed and Sealed this

Fifth Day of October, 2010

David J. Kappos
*Director of the United States Patent and Trademark Office*